United States Patent
Mueck et al.

(10) Patent No.: US 10,880,939 B2
(45) Date of Patent: *Dec. 29, 2020

(54) SYSTEM AND METHOD FOR CONTROLLING A TRANSMISSION BETWEEN A NETWORK AND A TERMINAL DEVICE

(71) Applicant: Apple Inc., Cupertino, CA (US)

(72) Inventors: Markus Dominik Mueck, Unterhaching (DE); Ingolf Karls, Feldkirchen (DE); Christian Drewes, Germering (DE); Erfan Majeed, Duisburg (DE); Guido Bruck, Voerde (DE); Peter Jung, Duisburg (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,066

(22) Filed: Jun. 27, 2019

(65) Prior Publication Data
US 2019/0387562 A1   Dec. 19, 2019

Related U.S. Application Data

(63) Continuation of application No. 15/393,363, filed on Dec. 29, 2016, now Pat. No. 10,390,382.

(51) Int. Cl.
*H04W 76/15* (2018.01)
*H04L 1/00* (2006.01)
(Continued)

(52) U.S. Cl.
CPC .............. *H04W 76/15* (2018.02); *H04B 7/02* (2013.01); *H04L 1/00* (2013.01); *H04L 1/0003* (2013.01);
(Continued)

(58) Field of Classification Search
CPC .............. H04W 52/0245; H04W 24/02; H04W 72/082; H04W 48/16; H04W 48/20;
(Continued)

(56) References Cited

U.S. PATENT DOCUMENTS 5,841,764 A    11/1998   Roderique
6,034,952 A *   3/2000   Dohi ................... H04B 17/336
                                                                                                                              370/335
(Continued)

FOREIGN PATENT DOCUMENTS

WO      2016028262 A1    2/2016

OTHER PUBLICATIONS

International Search Report based on application No. PCT/US2017/067763, dated Apr. 11, 2018, 10 pages.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

A system and a method for controlling communication between a network and a terminal device, the method including: selecting a plurality of network access nodes based on each network access node being associated with a distinguishing transmission feature; allocating a digital bit pattern to each distinguishing transmission feature, modifying a transmission to the terminal device based on the digital bit pattern; transmitting the transmission to the terminal device; receiving the transmission at the terminal device; identifying the distinguishing transmission feature from the transmission; and processing the transmission based on the digital bit pattern allocated to the distinguishing transmission feature.

20 Claims, 15 Drawing Sheets

(51) Int. Cl.
*H04W 48/20* (2009.01)
*H04B 7/02* (2018.01)
*H04W 48/16* (2009.01)

(52) U.S. Cl.
CPC .......... *H04W 48/20* (2013.01); *H04W 48/16* (2013.01); *Y02D 30/70* (2020.08)

(58) Field of Classification Search
CPC .......... H04W 76/15; H04L 5/006; H04L 1/00; Y02D 70/1264; Y02D 70/26; Y02D 70/1246; Y02D 70/22; Y02D 70/00; Y02D 70/21
See application file for complete search history.

(56) References Cited

U.S. PATENT DOCUMENTS

| | | | |
|---|---|---|---|
| 6,178,535 | B1 | 1/2001 | Kajala |
| 7,715,415 | B1 | 5/2010 | Pannell |
| 2004/0257975 | A1* | 12/2004 | Proctor, Jr. .......... H04B 7/2628 370/203 |
| 2006/0135101 | A1* | 6/2006 | Binshtok .............. H04B 7/0857 455/232.1 |
| 2010/0067514 | A1 | 3/2010 | Luo et al. |
| 2014/0177756 | A1 | 6/2014 | Park et al. |
| 2015/0319686 | A1 | 11/2015 | Hedberg et al. |
| 2016/0334499 | A1 | 11/2016 | Fischer |
| 2017/0099616 | A1* | 4/2017 | Tong ..................... H04L 1/0026 |

OTHER PUBLICATIONS

Unknown, "Evolved Universal Terrestrial Radio Access(E-UTRA);Physical Channels and Modulation," Technical Specification, Dec. 2015, TS 36.211 v12.8.0.,3GPP, Sophia Antipolis, France.
Unknown, "Physical layer procedures," Technical Specification, Jun. 2016, TS 36.213 v12.10.0.,3GPP, Sophia Antipolis, France.
Unknown, "Physical layer, Measurements," Technical Specification, Jun. 2016, TS 36.214 v13.2.0.,3GPP, Sophia Antipolis, France.
Jing Xu et al., "Copperative Distributed Optimization for the Hyper-Dense Small Cell Deployment", IEEE Communications Magazine, May 2014, pp. 61-67.
Jeyadeepan Jeganathan et al., "Spatial Modulation: Optimal Detection and Performance Analysis", IEEE Communications Letters, Aug. 2008, p. 545-547, vol. 12, No. 8.
Erfan Majeed et al., "Advanced Receiver Design for Interfering Small Cell Deployments in LTD Networks", 2015 IEEE Conference on Standards for Communications and Networking (CSCN), 2015, p. 294-299.
Tzi-Dar Chiueh et al., "OFDM Baseband Receiver Design for Wireless Communications", 2007, John Wiley and Sons (Asia) Pte Ltd, Singapore.

* cited by examiner

SYSTEM AND METHOD FOR CONTROLLING A TRANSMISSION BETWEEN A NETWORK AND A TERMINAL DEVICE

CROSS-REFERENCE TO RELATED APPLICATIONS

This application is a Continuation application and claims priority to U.S. application Ser. No. 15/393,363 filed on Dec. 29, 2016, which is herein incorporated by reference in their entirety for all purposes.

TECHNICAL FIELD

Various embodiments relate generally to a system and method of controlling a transmission.

BACKGROUND

An access network, such as a radio access network, may include a large number of network access nodes, for example, in small cell networks, so that a terminal device proximately located to the network access nodes may be within communicable range of a plurality of the network access nodes.

To increase data throughput, a transmission received at the terminal device may have additional bits encoded via properties of the signal itself, i.e., a transmission or a transmission source, such as a network access node, may have an identifying property distinct from other transmissions or transmission sources, and different from an identifier included within the payload of a data transmission. The terminal device may use the identifying property of the signal to identify additional encoded bits. Thus the greater the number of network access nodes in communicable range, the more a number of transmissions may be provided with various identifying properties than can be used to encode additional data. Accordingly, data throughput from the radio access network to the terminal device may be enhanced independently from channel conditions of the air interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
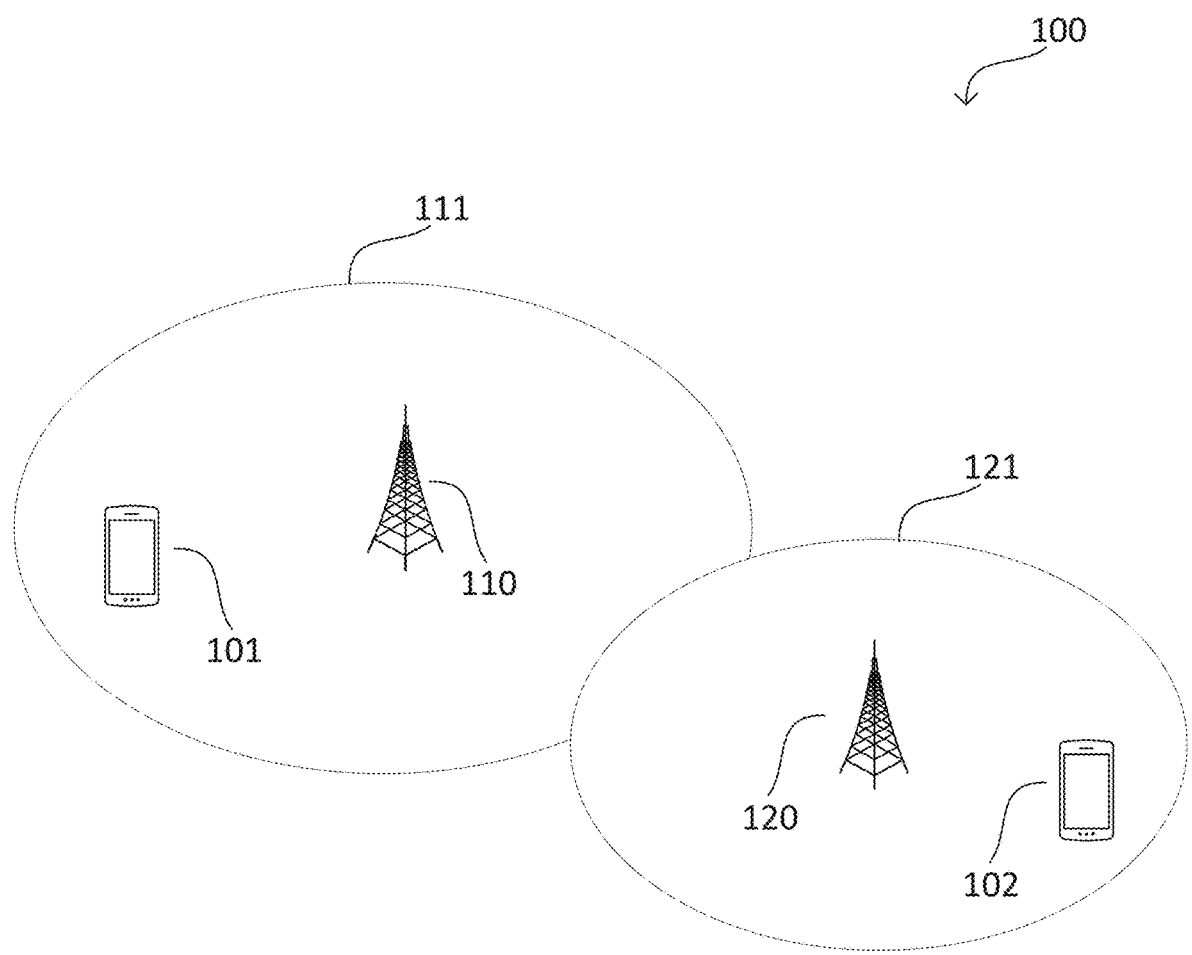
FIG. 1 shows a radio access network and terminal devices.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as a non-transitory computer readable medium, in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component comprising one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "network access node" used in reference to an access point of a radio network may be understood as a base station, such as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sector of a base station. A base station may thus serve one or more cells (or sectors), where each cell is characterized by a distinct communication channel. Furthermore, the term "cell" may be utilized to refer to any of a macrocell, microcell, femtocell, picocell, etc.

A "small cell" may refer to a microcell, femtocell, or picocell, etc. The "small cell" may be a network access node with a radio range of a few meters to 1 or 2 kilometers. Accordingly, a "small cell" may be lower-powered in comparison to a macrocell, and may operate in both licensed and unlicensed spectrum. Thus, a "small cell network" may be a network composed of "small cells".

The following description may detail exemplary scenarios involving mobile communications devices operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as any Cellular Wide Area radio communication technology, which may include, e.g., a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE-Advanced Pro, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code Division Multiple Access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, car radio phone), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, etc.), LTE standards used to share spectrum with other RATs in general (such as LTE in unlicensed spectrum (LTE-U), LTE License Assisted Access (LTE-LAA), MulteFire, as well as WiFi standards (such as IEEE 802.11a, IEEE 802.11b, IEEE 802.11g, IEEE 802.11n, etc), technologies operating above 90 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc. In addition, the examples herein may be used in the context of any spectrum management scheme, such as dedicated licensed spectrum (in which a predefined part of the spectrum is licensed to one or more users who may have exclusive access to the predefined spectrum), unlicensed spectrum (in which any device may operate in the associated spectrum), shared spectrum (e.g., Licensed Shared Access (LSA) in such frequency ranges in Europe as 2.3-2.4 GHz, 3.4-3.6 GHz, 3.6-3.8 GHz, as well as the Spectrum Access System (SAS), including frequencies in the U.S. of 3.55-3.7 GHz. The examples provided herein are thus understood as being applicable to various other mobile communication technologies, both existing and not yet formulated, particularly in cases where such mobile communication radio communications systems share the underlying features disclosed in the following examples.

The term "network" as utilized herein, e.g., in reference to a communication network such as a radio access network, encompasses both an access section of a network (e.g., a radio access network (RAN) section) and a core section of a network (e.g., a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" or "communications" encompasses one or both of transmitting and receiving, i.e., unidirectional or bidirectional communication in one or both of the incoming and outgoing directions. The term "calculate" encompass both "direct" calculations via a mathematical expression/formula/relationship and "indirect" calculations via lookup tables and other array indexing or searching operations.

FIG. 1 shows an access network 100, which may include terminal devices 101 and 102, in addition to network access nodes 110 and 120. Access network 100 may communicate via network access nodes 110 and 120 with terminal devices 101 and 102 via various means. Access network 100 may be an ad-hoc network, which may be self-organizing, i.e., the ad-hoc network may be composed of devices that are not pre-configured to have certain roles. A device may be an apparatus capable of communicating via the communication means of access network 100. Any device may independently become part of access network 100, e.g., via self-configuration and/or registration with our devices. Thus, access network 100 does not have a fixed set of devices. The ad-hoc network may be composed of heterogeneous devices or homogenous devices. Homogeneous devices may all have the same properties, such as computational power, communication rate, communication technologies, etc. Heterogeneous devices on the other hand, may have varying properties. Communications between devices in the ad-hoc network may be able to communicate directly to one another, e.g., peer-to-peer, or may be synchronized to forward communications via other devices to a targeted device, e.g., peer-to-remote.

The ad-hoc network may include a hierarchy or a system in which one or more devices, e.g., network access nodes 110 and 120, may direct other devices in access network 100 to transmit communications. The hierarchy of devices may be based on computational power. For example, devices with a higher computational power than other devices may be assigned a higher hierarchy, and may thus direct the communications of lower hierarchy devices, e.g., to direct communication forwarding more efficiently.

Access network 100 may be a sound wave access network. Devices, e.g., network access nodes 110 and 120, as well as terminal devices 101 and 102, may utilize transducers, e.g., including a diaphragm, to convert electrical signals into physical sound waves that propagate through a medium, such as air. The sound waves may be in an ultrasonic frequency and may be modulated to convey communications between devices.

Access network 100 may be an optical access network. Devices, e.g., network access nodes 110 and 120, as well as terminal devices 101 and 102, may utilize electromagnetic radiation in, for example, the visible light spectrum, infrared spectrum, and/or ultraviolet spectrum to convey communications between devices. Communications may be effected between a light source and a light-sensitive sensor.

Access network 100 may be a radio access network, which may hereon be referred to as radio access network 100. Although certain aspects of this disclosure may describe particular radio access network contexts (such as, e.g., LTE, UMTS, GSM, other 3rd Generation Partnership Project (3GPP) networks, WLAN/WiFi, Bluetooth, 5G, mmWave, etc.), the subject matter detailed herein is considered demonstrative in nature and may, therefore, be analogously applied mutatis mutandis to any other radio access network. The number of network access nodes and terminal devices in radio access network 100 is exemplary and is scalable to any amount.

Accordingly, in an exemplary cellular context, network access nodes 110 and 120 may be base stations (e.g., eNodeBs, NodeBs, Base Transceiver Stations (BTSs), etc.), while terminal devices 101 and 102 may be cellular terminal devices (e.g., Mobile Stations (MSs), User Equipments (UEs), etc.). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio access network 100. The cellular core network may interface with one or more external data networks. In an exemplary short-range context, network access node 110 and 120 may be access points (APs, e.g., WLAN or WiFi APs), while terminal device 101 and 102 may be short range terminal devices (e.g., stations (STAs)). Network access nodes 110 and 120 may interface (e.g., via an internal or external router) with one or more external data networks.

Network access nodes 110 and 120 (and other network access nodes of radio access network 100 not explicitly shown in FIG. 1) may, accordingly, provide a radio access network to terminal devices 101 and 102 (and other terminal devices of radio access network 100 not explicitly shown in FIG. 1). In an exemplary cellular context, the radio access network provided by network access nodes 110 and 120 may enable terminal devices 101 and 102 to wirelessly access the core network via radio communications. The core network may provide switching, routing, and transmission, for traffic data related to terminal devices 101 and 102, and may further provide access to various internal data networks (e.g., control nodes, other terminal devices on radio access network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., other terminal devices connected to radio access network 100) and external data networks (e.g., data networks providing voice, text, multimedia (audio, video, image), and other Internet and application data).

The radio access network and core network (if applicable) of radio access network 100 may be governed by network protocols that may vary depending on the specifics of radio access network 100. Such network protocols may define the scheduling, formatting, and routing of both user and control data traffic through radio access network 100, which includes the transmission and reception of such data through both the radio access and core network domains of radio access network 100. Accordingly, terminal devices 101 and 102 and network access nodes 110 and 120 may follow the defined network protocols to transmit and receive data over the radio access network domain of radio access network 100, while the core network may follow the defined network protocols to route data within and outside of the core network. Exemplary network protocols include LTE, UMTS, GSM, WiMAX, Bluetooth, WiFi, mmWave, etc., any of which may be applicable to radio access network 100.

Figure 2:
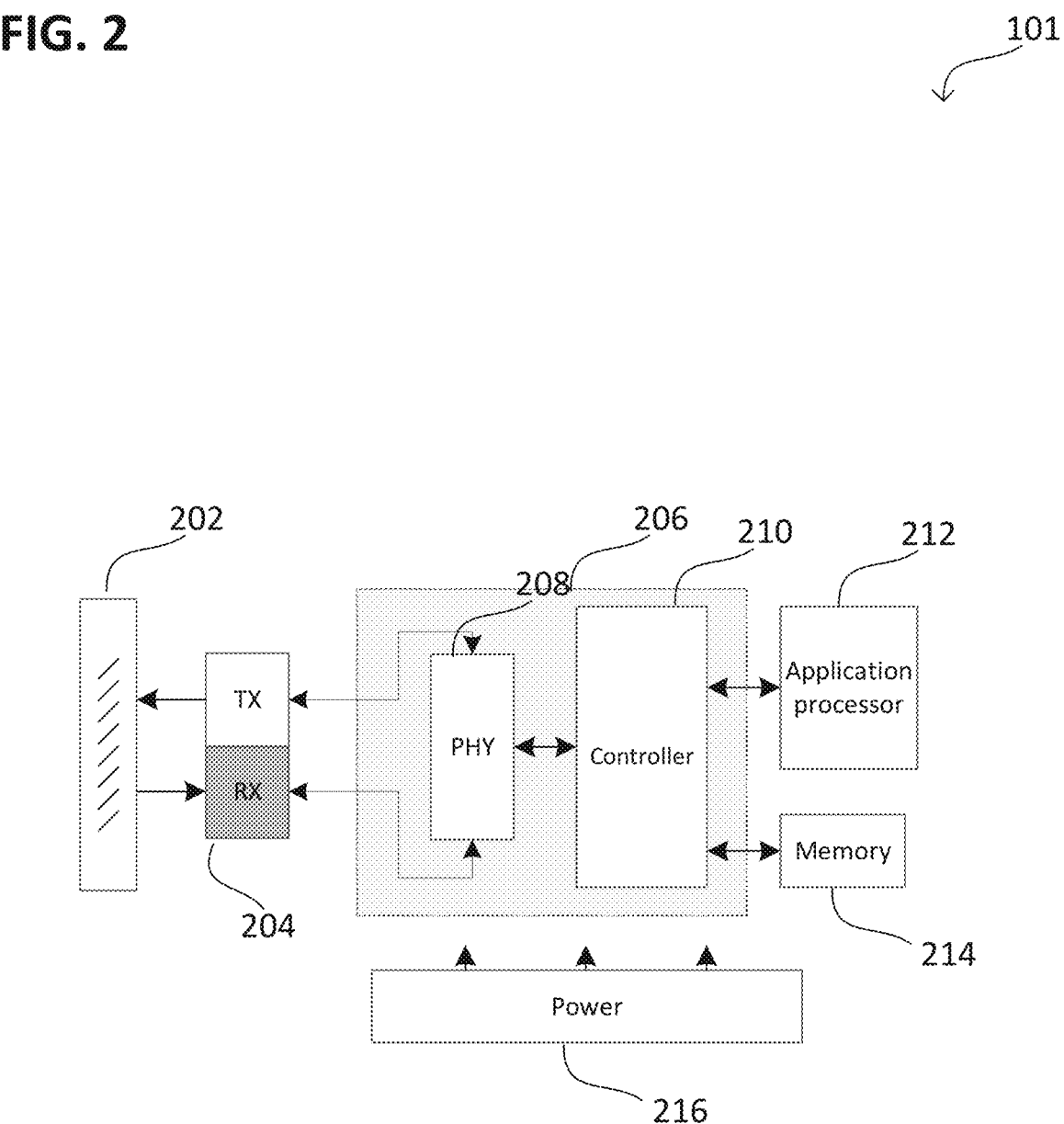
FIG. 2 shows a block diagram of a terminal device.

FIG. 2 shows an exemplary internal configuration of terminal device 101, which may include antenna system 202, radio frequency (RF) transceiver 204, baseband modem 206 (including physical layer processing circuit 208 and controller 210), application processor 212, memory 214, and power supply 216. Although not explicitly shown in FIG. 2, terminal device 101 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output (I/O) devices (display(s), keypad(s), touchscreen(s), speaker(s), external button(s), camera(s), microphone(s), etc.), etc.

In an operational overview, terminal device 101 may transmit and receive radio signals on one or more radio access networks. Baseband modem 206 may direct communication functionality of terminal device 101 according to the communication protocols associated with each radio access network and may execute control over antenna system 202 and RF transceiver 204 in order to transmit and receive radio signals according to the formatting and scheduling parameters defined by each communication protocol, which together, may be referred to as a receiver, e.g., including antenna system 202, RF transceiver 204, and baseband modem 206. Although various practical designs may include separate communication circuitry for each supported radio access technology (e.g., a separate antenna, RF transceiver, physical layer processing circuit, and controller), for conciseness the configuration of terminal device 101 shown in FIG. 2 depicts only a single instance of such components.

Terminal device 101 may transmit and receive radio signals with antenna system 202, which may be a single antenna or an antenna array composed of multiple antennas and may additionally include analog antenna combination and/or beamforming circuitry. In the receive path (RX), RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 204. RF transceiver 204 may accordingly include analog and digital reception circuitry including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission circuitry including amplifiers (e.g., a Power Amplifier (PA), filters, RF modulators (e.g., an RF IQ modulator), and digital-to-analog converters (DACs) to mix the digital baseband samples received from baseband modem 206 to produce the analog radio frequency signals for wireless transmission by antenna system 202. Baseband circuit 206 may control the RF transmission and reception of RF transceiver 204, including specifying transmission and reception radio frequencies for operation of RF transceiver 204.

As shown in FIG. 2, baseband modem 206 may include physical layer processing circuit 208, which may perform physical layer (Layer 1) transmission and reception processing to prepare outgoing transmit data provided by controller 210 for transmission via RF transceiver 204 and prepare incoming received data provided by RF transceiver 204 for processing by controller 210. Controller 210 may accordingly perform one or more of: error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Although not explicitly shown in FIG. 2, physical layer processing circuit 208 may include a physical layer control circuit such as a processor configured to control the various hardware and software processing components of physical layer processing circuit 208 in accordance with physical layer control logic defined by the communications protocol for the relevant radio access technologies. Furthermore, while physical layer processing circuit 208 is depicted as a single component in FIG. 2, physical layer processing circuit 208 may be collectively composed of separate sections of physical layer processing circuitry where each respective section is dedicated to the physical layer processing of a particular radio access technology.

Terminal device 101 may be configured to operate according to one or more radio access technologies, which may be directed by controller 210. Controller 210 may thus be responsible for controlling the radio communication components of terminal device 101 (antenna system 202, RF transceiver 204, and physical layer processing circuit 208) in accordance with the communication protocols of each supported radio access technology, and accordingly may represent the Access Stratum and Non-Access Stratum (NAS) (also encompassing Layer 2 and Layer 3) of each supported radio access technology. Controller 210 may be structurally embodied as a protocol processor configured to execute protocol software (retrieved from a controller memory) and subsequently control the radio communication components of terminal device 101 in order to transmit and receive communication signals in accordance with the corresponding protocol control logic defined in the protocol software.

Controller 210 may, therefore, be configured to manage the radio communication functionality of terminal device 101 in order to communicate with the various radio and core network components of radio access network 100, and accordingly may be configured according to the communication protocols for multiple radio access networks. In some aspects, controller 210 may be configured according to multiple cellular radio communication technologies, e.g., according to LTE, UMTS, and GSM. In some aspects, controller 210 may be configured according to cellular radio communications technologies and short-range radio communications technologies, such as, e.g., at least one of WiFi or Bluetooth and at least one of LTE, UMTS, and GSM. Controller 210 may either be a unified controller that is collectively responsible for all supported radio access technologies (e.g., LTE, UMTS, GSM, Bluetooth, WiFi, etc.) or may be composed of multiple separate controllers where each controller is a dedicated controller for a particular radio access technology (e.g., a dedicated LTE controller, a dedicated UMTS controller, a dedicated GSM controller, a dedicated WiFi controller, a dedicated Bluetooth controller). Controller 210 may be responsible for directing radio communication activity of terminal device 101 according to the communication protocols of the supported radio access networks. As previously noted regarding physical layer processing circuit 208, one or both of antenna system 202 and RF transceiver 204 may similarly be partitioned into multiple dedicated components that each respectively correspond to one or more of the supported radio access technologies. Depending on the specifics of such configurations and the number of supported radio access technologies, controller 210 may be configured to control the radio communications operations of terminal device 101 in accordance with a master/slave RAT hierarchy or multi-SIM system.

Terminal device 101 may also include application processor 212, memory 214, and power supply 212. Application processor 212 may be a CPU configured to execute various applications and/or programs of terminal device 101 at an application layer of terminal device 101, such as, e.g., an Operating System (OS), a User Interface (UI) for supporting user interaction with terminal device 101, and/or various user applications. The application processor may interface with baseband modem 206 as an application layer to transmit and receive user data such as voice data, audio/video/image data, messaging data, application data, basic Internet/web access data, etc., over a the radio network connection(s) provided by baseband modem 206. Although shown separately in FIG. 2, this distinction highlights the differences between baseband modem 206 and application processor 212 on a functional level. Accordingly, in some aspects baseband modem 206 and application processor 212 may be structurally separate, e.g., a separate baseband modem 206 and a separate application processor 212. In some aspects, baseband modem 206 and application processor 212 may be structurally integrated, such as an integrated baseband modem/application processor 206/212.

Memory 214 may embody a memory component of terminal device 101, e.g., a hard drive or another permanent memory device. Although not explicitly depicted in FIG. 2, the various other components of terminal device 101 shown in FIG. 2 may additionally each include integrated permanent and non-permanent memory components, for example, for storing software program code, buffering data, etc.

Power supply 216 may be an electrical power source that provides power to the various electrical components of terminal device 101. Depending on the design of terminal device 101, power supply 216 may be a 'finite' power source such as, e.g., a battery (rechargeable or disposable) or an 'indefinite' power source such as, e.g., a wired electrical connection. Operation of the various components of terminal device 101 may thus pull electrical power from power supply 216.

In accordance with conventional radio access networks, terminal devices 101 and 102 may execute mobility procedures to: connect to, disconnect from, and switch between, available network access nodes of the radio access network of radio access network 100. As each network access node of radio access network 100 may have a specific coverage area, terminal devices 101 and 102 may be configured to select and re-select between the available network access nodes in order to maintain a strong radio access connection with the radio access network of radio access network 100. For example, terminal device 101 may establish a radio access connection with network access node 110 while terminal device 102 may establish a radio access connection with network access node 120. In the event that the current radio access connection degrades, terminal devices 101 or 102 may seek a new radio access connection with another network access node of radio access network 100; for example, terminal device 102 may move from the coverage area 121 of network access node 120 into the coverage area 111 of network access node 110. As a result, the radio access connection with network access node 120 may degrade, which terminal device 102 may detect via radio measurements such as signal strength or signal quality measurements of network access node 120. Depending on the mobility procedures defined in the appropriate network protocols for radio access network 100, terminal device 102 may seek a new radio access connection (which may be triggered at terminal device 102 or by the radio access network), such as by performing radio measurements on neighboring network access nodes to determine whether any neighboring network access nodes can provide a suitable radio access connection. As terminal device 102 may have moved into the coverage area 111 of network access node 110, terminal device 102 may identify network access node 110 (which may be selected by terminal device 102 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Although reference may be made in the following description to terminal device 101, e.g., that terminal device 101 may receive a transmission, the same may apply to the relevant components of terminal device 101 that may perform the described function, e.g., the receiver may receive the transmission.

Figure 3:
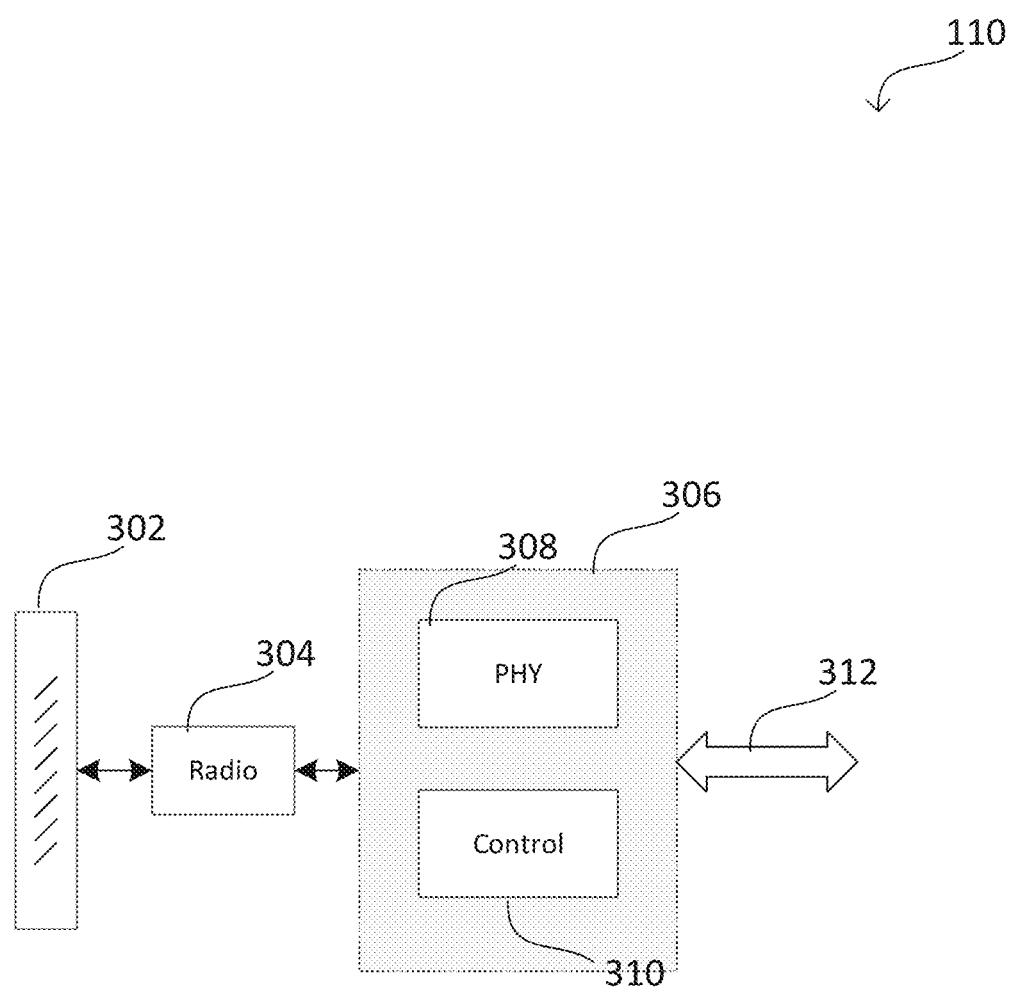
FIG. 3 shows a block diagram of a network access node.

FIG. 3 shows an exemplary internal configuration of a network access node such as network access node 110. As shown in FIG. 3, network access node 110 may include antenna system 302, radio circuit 304, communication circuit 306 (including physical layer circuit 308 and control circuit 310), and backhaul interface 312. In an overview of the operation of network access node 110, network access node 110 may transmit and receive radio signals via antenna system 302, which may be an antenna array including one or more antennas. Radio circuit 304 may perform transmit and receive RF processing in order to convert outgoing digital data from communication circuit 306 into analog RF signals to provide to antenna system 302 for radio transmission and to convert incoming analog RF signals received from antenna system 302 into digital data to provide to communication circuit 306. Physical layer circuit 308 may be configured to perform physical layer reception processing on digital data received from radio circuit 304 to provide to control circuit 310 and to perform physical layer transmission processing on digital data received from control circuit 310 to provide to radio circuit 304. Control circuit 310 may control the communication functionality of network access node 110 according to the corresponding radio access protocols, e.g., LTE, which may include exercising control over antenna system 302, radio circuit 304, and physical layer circuit 308. Each of radio circuit 304, physical layer circuit 308, and control circuit 310 may be structurally realized as hardware-defined circuitry, e.g., as one or more integrated circuits or FPGAs, as software-defined circuitry, e.g., as one or more processors executing program code that define arithmetic, control, and I/O instructions stored in a non-transitory computer-readable storage medium, or as a combination of hardware-defined circuitry and software-defined circuitry. Backhaul interface 312 may be a wired (e.g., Ethernet, fiber optic, etc.) or wireless (e.g., microwave radio or similar wireless transceiver system) interface that connects to a wired or wireless medium for transmitting and receiving data with other network nodes, including other network access nodes, a core network, and/or external data networks. In some aspects, backhaul interface 312 may include a wired connection point and driver that connects to a wired backhaul link. In some aspects, backhaul interface 312 may include a wireless transceiver system that transmits and receives radio signals on a wireless backhaul link.

Network access node 110 may thus provide the conventional functionality of network access nodes in radio access networks by providing a radio access network to enable served terminal devices to access desired communication data. For example, in some aspects backhaul interface 312 may interface with a core network, which may provide access to external data networks such as the Internet and other public and private data networks. In some aspects, backhaul interface 312 may interface with external data networks (e.g., via a router).

Figure 4:
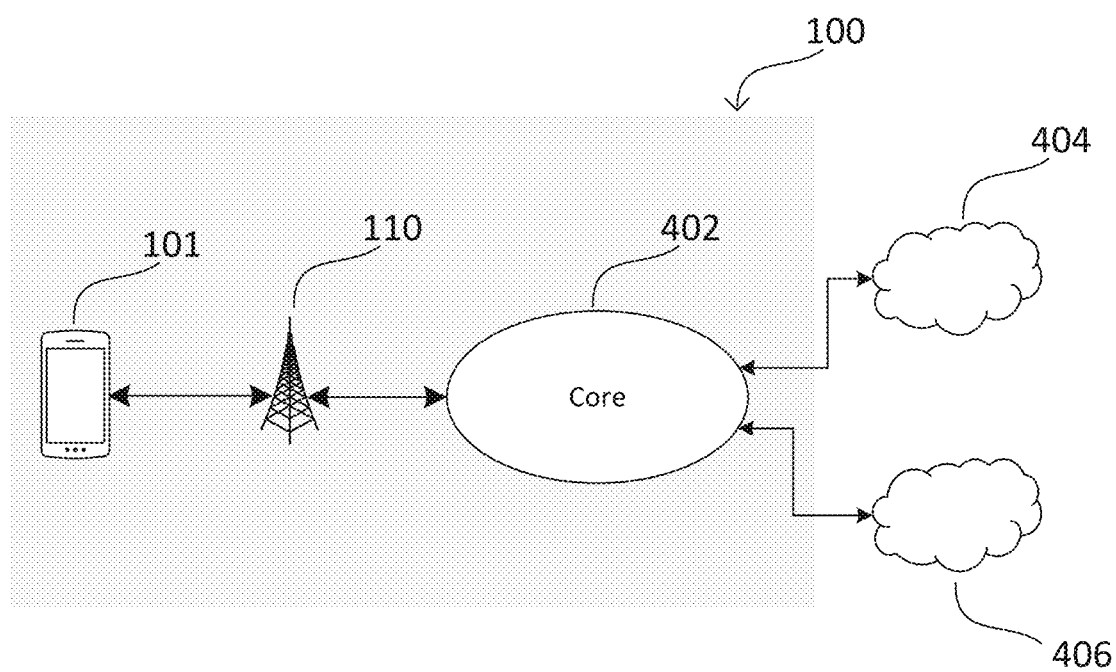
FIG. 4 shows a block diagram of a radio access network.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may, therefore, provide an infrastructure to route data between terminal device 101 and various external networks such as data network 404 and data network 406; accordingly, terminal device 101 may rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 101 may, therefore, establish a data connection with data network 404 and/or data network 406 that relies on network access node 110 and core network 402 for data transfer and routing.

Advances in radio access network design will provide ever more transmission sources, e.g., network access nodes including small cells, which may communicate with a mobile terminal. Such advances include network densification to address higher data rate requirements in future standards, e.g., 5G. In particular, network densification may include implementation of small cell networks (SCN) in radio access networks and extending the radio access spectrum above 6 GHz using millimeter wave bands.

Together, the implementation of these solutions may lead to the deployment of high performance, short-range, low power, and low cost network access nodes. These network access nodes may operate as stand-alone (SA) or non-stand-alone (NSA), e.g., integrated into macro-cell network infrastructure.

Figure 5A:
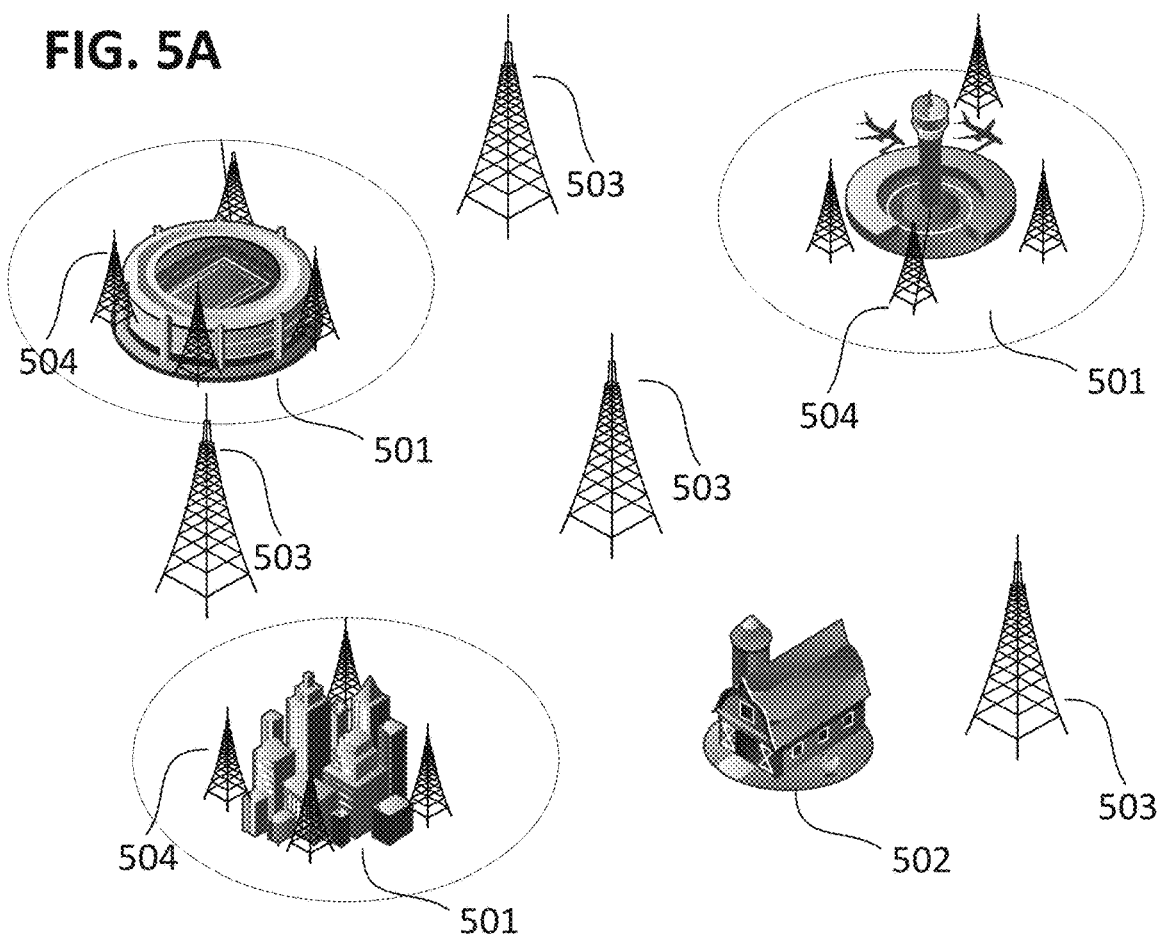
FIGS. 5A & 5B show small cell networks deployed in a radio access network.

Operation of such small cell networks may be based on user behavior and network traffic. Small cell networks, therefore, must be flexible and scalable. Many small cells may be densified in a small area where high data rates may be required as shown in FIG. 5A. Small, dense areas 501, such as stadiums, cities, shopping areas, or transportation hubs, may have small cell networks 504, whereas as other areas may have less expected traffic, such as area 502, which may be serviced via macro-cell network access nodes 503. Small cell networks 504 and macro-cell network access nodes 503 may be part of the same network, e.g., in a heterogeneous network (HetNet).

Accordingly, a small cell network may support network function virtualization (NFV) and self-organizing network (SON) technologies to operate in dense areas 501. NFV may refer to network architecture that may utilize general network computing hardware operating software (e.g., a virtual machine operating on a server or a cloud computing infrastructure) to perform network operations rather than purpose built hardware to perform certain operations. A self-organizing network may refer to a radio network containing network access nodes that may be configured to self-optimize the function of the network according to the categories of self-configuration, self-optimization, and self-healing, for example, as related to 3GPP and Next Generation Mobile Networks (NGMN) standards.

Figure 5B:
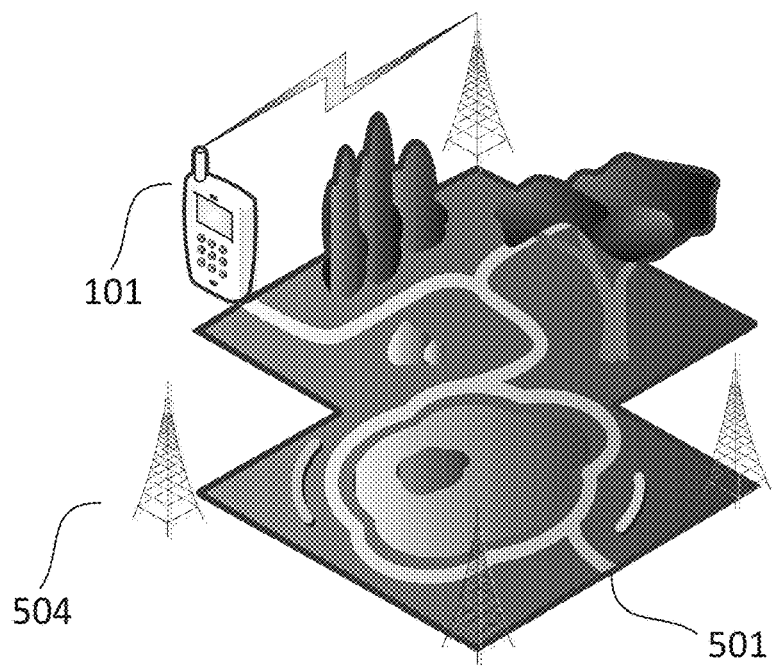

A small cell network 504, such as that shown in diagram 500B of FIG. 5B, may improve overall wireless communication efficiency to terminal devices 105 by orders of magnitude and may have a very high system robustness against noise and interference, which may typically be measured by a target SINR (signal-to-interference-plus-noise ratio) achieving a minimum target packet-error-rate (PER) or bit-error-rate (BER). Small cell networks, such as small cell network 504, may refer to a radio access network including small cells, and may operate as a collection of network access nodes in radio access network 100, discussed above.

Figure 6:
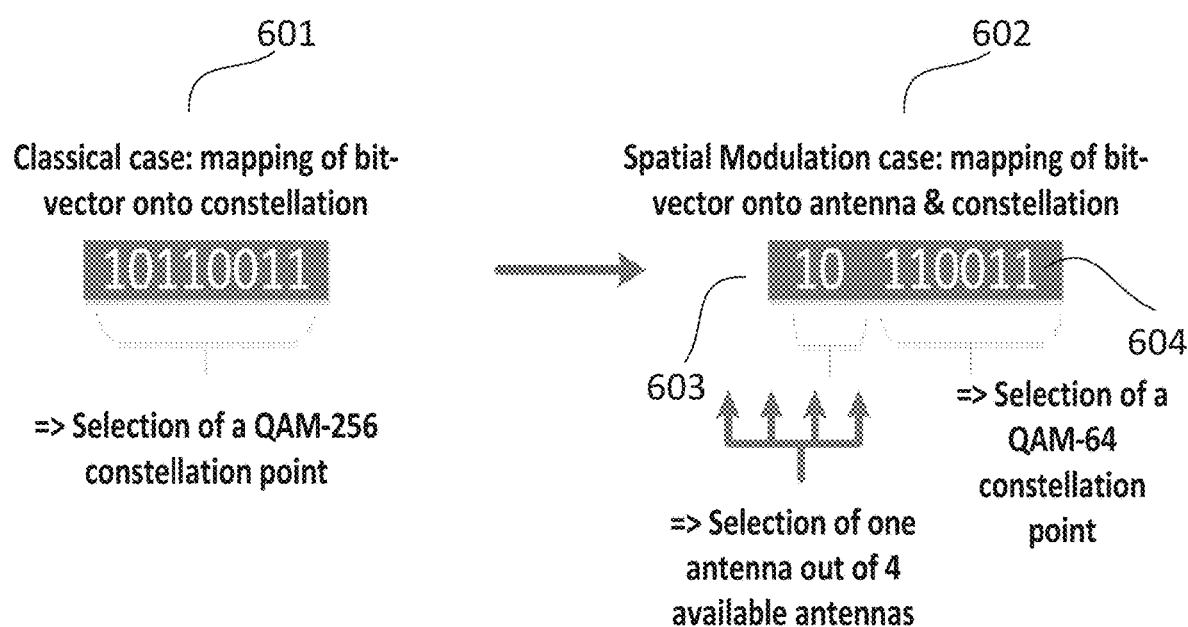
FIG. 6 shows a diagram illustrating 3D spatial modulation.

In addition, spatial modulation solutions may increase system energy efficiency as well as robustness against noise and interference and decrease implementation complexity compared to MIMO (multiple-input and multiple-output). In particular, the SINR levels may be optimized via spatial modulation as shown in FIG. 6.

As shown in diagram 601, a bit vector may be used to select a constellation point, e.g., for a QAM-256 (quadrature amplitude modulation) constellation, an 8-bit vector may identify a specific constellation point. Here, the bit vector is "10110011", which corresponds to a constellation point in a QAM-256 constellation.

In diagram 602, the bit vector has been divided into two parts. Part 603 is a bit vector corresponding to a transmission antenna of at least two co-located antennas of a network access node. Each antenna has a corresponding bit vector. For example, a network access node with four co-located transmit antennas may have each antenna correspond to a unique set of 2-bits. Part 604 is a reduced version of the bit vector in diagram 601 that will be transmitted from one of the transmission antennas of the network access node. Part 604 may be the bit vector of diagram 601 with part 603 removed. As part 603 is removed from the bit vector, only part 604 need be transmitted. Accordingly, part 604 of the bit vector may be modulated according to a QAM-64 constellation point and transmitted, rather than a QAM-256 constellation point including part 603 and 604.

A network access node, however, generally has a fixed number of transmit antennas and constraints regarding channel condition and antenna correlation so that the benefits of spatial modulation are limited. A terminal device in a radio access network 100 as described above on the other hand, is often surrounded by any number of network access nodes. Accordingly, any variable number of network access nodes may be used in a 3D modulation with beam hopping system to enhance data throughput to a terminal device 101.

Figure 7A:
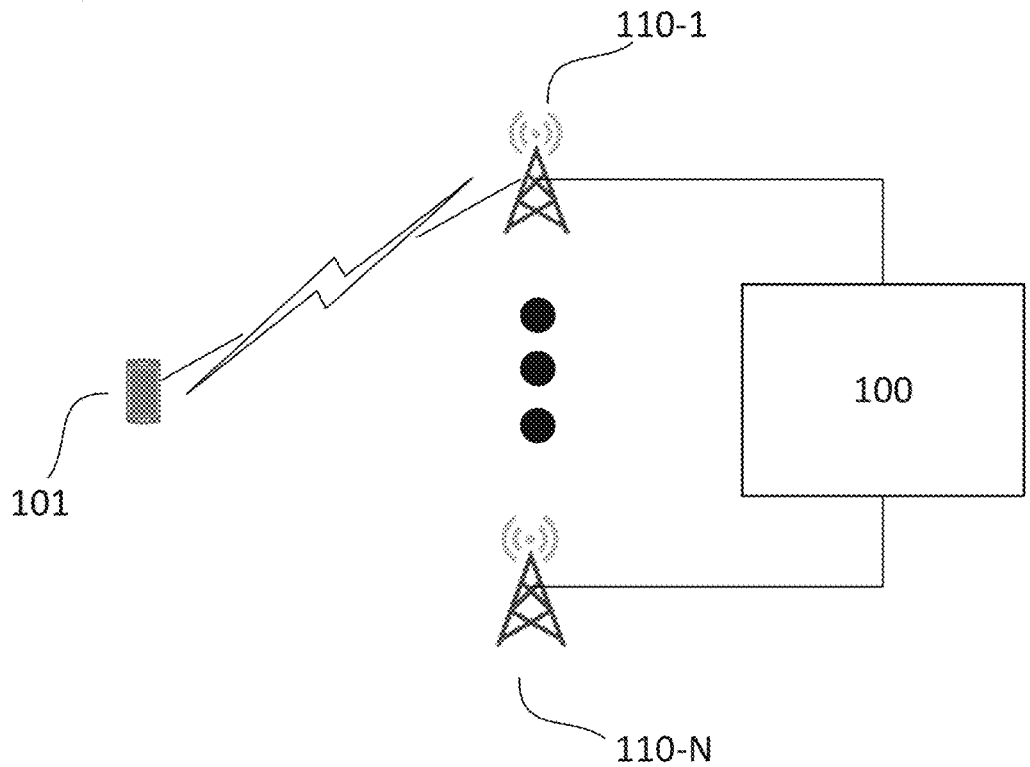
FIG. 7A shows a terminal device and available network access nodes.

As shown in FIG. 7A, terminal device 101 may have access to any number of available network access nodes 110-1 through 110-N, in which an available network access node may be an access network node in radio communication range of terminal device 101, e.g., neighbor cells around terminal device 101. In a small cell network, the number of available network access nodes may be densely deployed. Accordingly, 3D modulation with beam hopping may be operated across a radio access network 100 with access to a plurality of network access nodes, thus enhancing radio communications for terminal device 101.

Figure 7B:
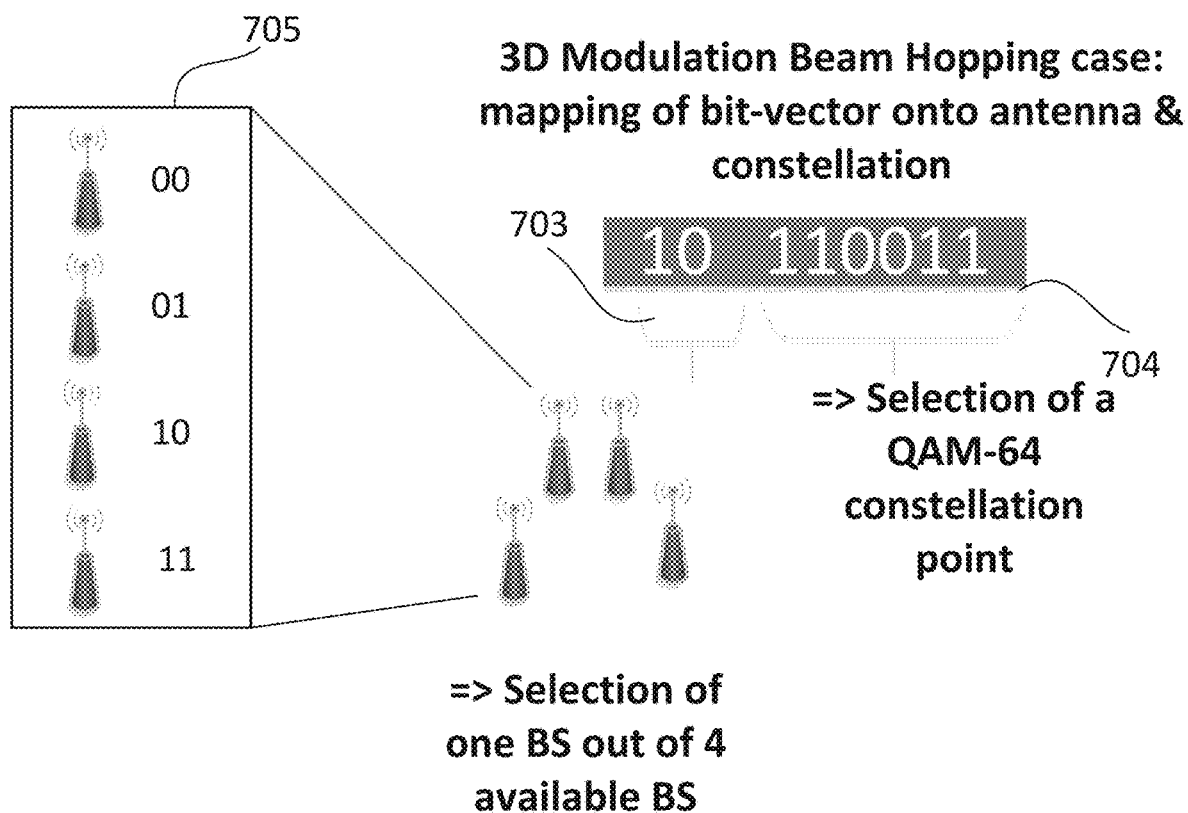
FIG. 7B shows a diagram illustrating 3D modulation with beam hopping.

FIG. 7B shows an exemplary implementation of 3D modulation with beam hopping. As shown in diagram 705, four network access nodes may be available for terminal device 101. Each network access node may be associated with a bit pattern, which may be a digital bit pattern, e.g., a unique pattern of bits that may be part of a bit vector. The number of characters forming the digital bit pattern may be dependent on the number of network access nodes available. The number of base stations required for a digital bit pattern containing b bits is given by $2^b$, where b is a whole number. For example, four network access nodes may each be assigned a digital bit pattern consisting of two bits, while eight network access nodes may each be assigned a digital bit pattern consisting of three bits, etc. Thus, as shown in the example of diagram 705, a first network access node may be allocated "00", a second network access node may be allocated "01", a third network access node may be allocated "10", and a fourth network access node may be allocated "11".

Therefore, a bit vector may be divided into a part 703 allocated to a network access node and a part 704 that is mapped to a modulation alphabet, such as a QAM constellation, e.g., here, a QAM-64 constellation point rather than a QAM-256 constellation point. Part 703 indicates a transmission source that is allocated a digital bit pattern, e.g., a network access node that transmitted part 704. A terminal device 101 may then combine part 703 and part 704 by identifying the transmission source of part 704 and the allocated digital bit pattern for part 703 for the identified transmission source, e.g., identified via a propagation channel from a network access node.

Figure 8A:
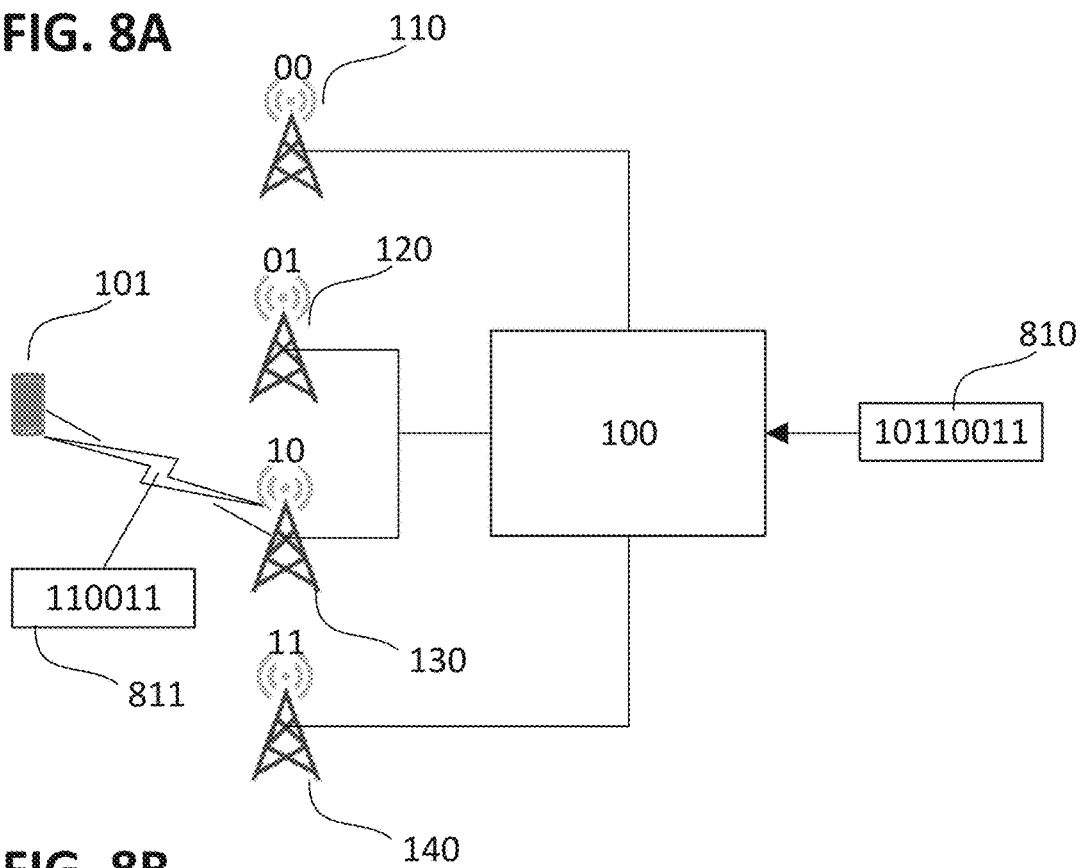
FIGS. 8A & 8B show transmissions from the radio access network to the terminal device.

Accordingly, as shown in FIG. 8A, network access node 110, network access node 120, network access node 130, and network access node 140, may be part of radio access network 100. Network access node 110 may be allocated digital bit pattern "00", network access node 120 may be allocated digital bit pattern "01", network access node 130 may be allocated digital bit pattern "10", and network access node 140 may be allocated digital bit pattern "11". Bit vector 810 may consist of 8 bits, corresponding to a modulation order of QAM-256, and may be prepared to be transmitted to terminal device 101. According to 3D modulation with beam hopping, the modulation order of the transmission may be adjusted from an effective modulation order, here QAM-256 for 8 bits, to a transmission modulation order that may be lower than the effective modulation order.

As illustrated in FIG. 8A, bit vector 810 consisting of 8 bits is adjusted to bit vector 811 consisting of 6 bits. Thus, the modulation order is adjusted from QAM-256 to QAM-64. Radio access network 100 may determine that bit vector 811 begins with "10", modify bit vector 810 to bit vector 811 and select network access node 130 to transmit to terminal device 101.

Terminal device 101 may identify, via a distinguishing transmission feature, e.g., a distinguishing transmission feature, discussed below, which of network access node 110, network access node 120, network access node 130, and network access node 140, sent the transmission. Based on the identified distinguishing transmission feature and bit vector 811, the terminal device 101 may recreate bit vector 810. As shown here, terminal device 101 may identify network access node 130 has transmitted bit vector 811, and, as terminal device 101 is aware digital bit pattern "10" is allocated to a distinguishing transmission feature associated with network access node 130, terminal device 101 may combine the digital bit pattern "10" with bit vector 811 to receive bit vector 810.

Therefore, by reducing the modulation order of the transmission to terminal device 101, the transmission robustness may be improved as well as reducing the computational complexity associated with higher modulation orders thus decreasing the energy per bit. The modulation order may be further reduced based on a greater number of network access nodes.

Figure 8B:
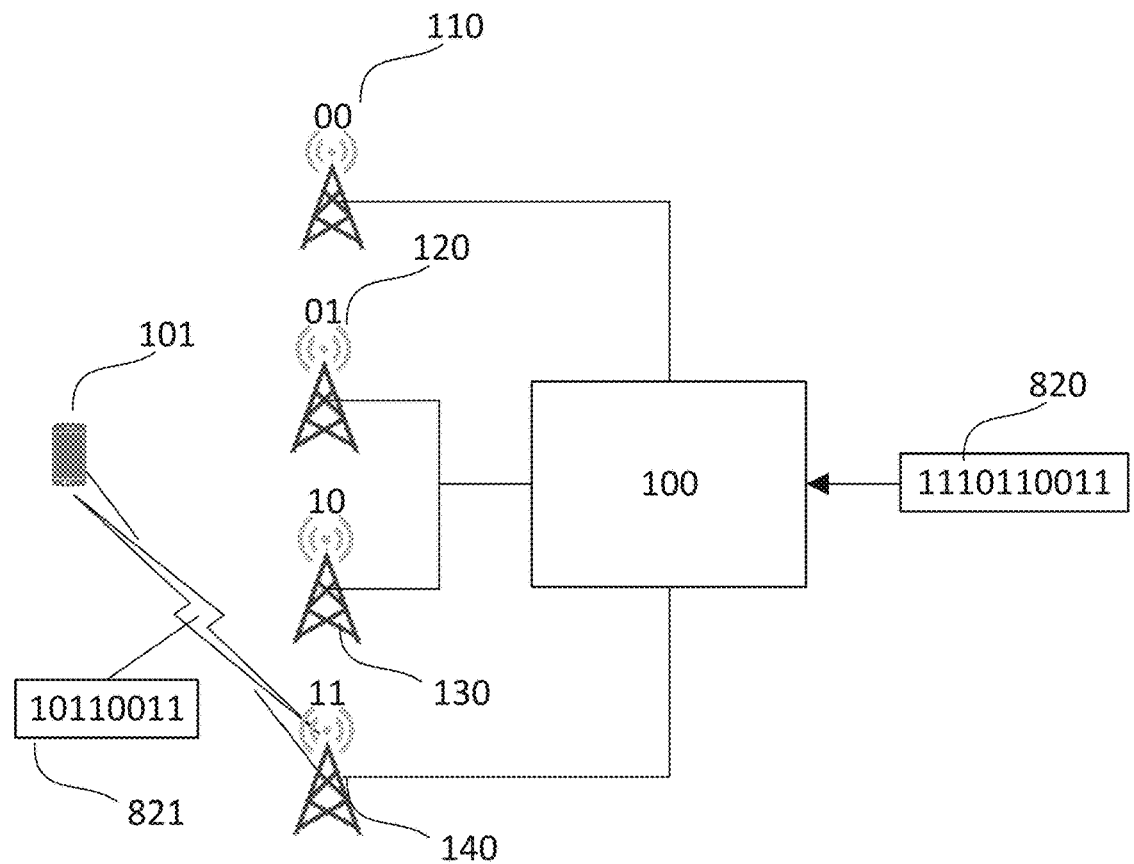

As shown in FIG. 8B, the effective modulation order of a transmission may even be increased. For example, based on radio conditions, radio access network 100 and terminal device may determine QAM-256 is the highest modulation order possible for communications, e.g., based on signal and channel measurements or other parameters. The effective modulation order of bit vector 820 in FIG. 8B however, is QAM-1024. Radio access network 100 may then transmit bit vector 821 with a modulation order of QAM-256 via network access node 140, which has been allocated the digital bit pattern "11". Terminal device 101 may then identify the transmission is from network access node 140 and combine the digital bit pattern "11" allocated to network access node 140 with the transmission of bit vector 821 to recreate bit vector 820.

In another aspect of the disclosure, the propagation path between each of the network access nodes 110, 120, 130, and 140, may be subject to different environmental factors so that the transmission modulation order, e.g., the highest modulation order possible for communications, determined for transmissions from each network access node to terminal device 101 may vary. Accordingly, the effective modulation order from each of network access nodes 110, 120, 130, and 140, may vary so that some network access nodes will have a lower effective modulation order than others.

Accordingly, radio network 100 may increase data throughput by encoding a digital bit pattern in a distinguishing transmission feature of a transmission for terminal device 101. The distinguishing transmission feature may be associated with a particular transmission source, i.e., any device that transmits the transmission to terminal device 101, e.g., a network access node. Thus, in order to process, e.g., demodulate and decode, the transmission from radio access network 100, terminal device 101 must be able to identify the distinguishing transmission feature, and, therefore, determine the allocated digital bit pattern to be combined with the transmitted data. Accordingly, from the point of view of terminal device 101, each transmission source must have a distinguishing transmission feature so that the transmission source may be identified from among a number of transmission sources. By identifying a transmission based on a distinguishing transmission feature, the data throughput to terminal device 101 may be maximized, as transmitting a transmission source identifier may be less efficient.

Thus the transmission may be modified from an effective transmission, e.g., bit vector 810 or 820, by removing the digital bit pattern associated with the distinguishing transmission feature from a predetermined position of the effective transmission, e.g., from the beginning or end of the bit vector. Therefore, the transmission may be a truncated version of the effective transmission. The transmission may then be transmitted to the terminal device 101 by the network access node allocated the digital bit pattern removed from the predetermined position of the effective transmission. Terminal device 101 may then receive the transmission and identify the distinguishing transmission feature from the transmission, and thus add the digital bit pattern corresponding to the identified distinguishing transmission feature in the predetermined position of the transmission to recreate the effective transmission.

The distinguishing transmission feature, e.g., a distinguishing channel characteristic, may be any feature of a transmission that terminal device 101 may use to differentiate from another transmission, e.g., terminal device 101 may be able to differentiate between transmissions from different transmission sources, such as network access nodes. For example, the distinguishing transmission feature may be a signal metric, such as a signal reception power or signal quality (e.g., SINR); a transmission frequency, e.g., each transmission source may be assigned a different transmission frequency to terminal device 101, and/or a channel metric, such as a channel estimation of the propagation channel of a transmission from a network access node to the terminal device 101. Other examples include: a geographical location in relation to terminal device 101, which may be determined by terminal device 101 via beamforming; signaling; transmitted information such as a Code Division Multiple Access (CDMA) code, an additional bit pattern, such as a transmitted bit pattern to uniquely identify the transmission as associated with a distinguishing transmission feature; multicarrier assignment; a time slot; an antenna pattern/beam/joint transmission; associated channel characteristic; an associated Channel Quality Information (CQI); and/or an associated Channel State Information (CSI). Therefore, any distinguishing transmission feature may be used that terminal device 101 may be able to determine or detect. Radio access network 100 may then allocate a digital bit pattern to each distinguishing transmission feature. The allocation of the various digital bit patterns and the corresponding distinguishing transmission feature may be transmitted from radio access network 100 to terminal device 101 so that terminal device 101 may associate a particular digital bit pattern with a particular distinguishing transmission feature. As an example, a propagation channel from any given available network access node to terminal device 101 may be unique. Thus, the propagation channel may be used as a distinguishing transmission feature for terminal device 101 to use to determine the digital bit pattern that is processed in addition with the transmission.

The distinguishing transmission features may be preselected, such as using different transmission frequencies, an additional bit pattern, time slot, CDMA code, multicarrier assignment and/or the distinguishing transmission feature may be established from a training sequence, etc. Preselected distinguishing transmission features may be used as the channel characteristic may be distinguishable independent from the propagation channel, such as a transmission frequency. Accordingly, a preselected distinguishing characteristic need not be measured to determine its distinguishability. Accordingly, a preselected distinguishing characteristic may be transmitted to terminal device 101 from any source, so that the distinguishing characteristic is not tied to any particular network access node. Therefore, if terminal device 101 moves out of communicable range from a particular network access node, the preselected distinguishing transmission feature may be assigned by radio access network 101 to a new network access node that may be serving terminal device 101.

In an optional aspect of the disclosure, a part of a transmission, e.g., part 704, may be further composed of one or more parcels. A parcel may contain a predetermined number of bits, for example, a block of bits B. The parcel may include a modulation symbol associated with a constellation point, as discussed above. For example, a modulation order of QAM-16 may be associated with a constellation point of four bits, B, while QAM-64 16 may be associated with a constellation point of six bits, B.

A parcel may contain an additional bit pattern composed of a predetermined number of bits P. The additional bit pattern may be used as a distinguishing transmission feature that may be allocated a digital bit pattern. Thus, the transmission may be composed of a parcel containing P+B bits and the effective transmission would be the number of bits associated with the digital bit pattern assigned to distinguishing transmission feature of the P bits. Likewise, the transmission may contain one or more parcels, e.g., $P_1$-$N_1$-$P_2$-$N_2$-$P_3$-$N_3$, so that the transmission is composed of three distinguishing transmission features and three modulation symbols. Each modulation symbol of N bits is enhanced by the digital bit pattern associated with the, in this example, preceding P bits.

The arrangement of P bits and B bits may be in any order. For example, if the transmission is composed of multiple parcels, the P bits and the B bits may be interspersed, such as $P_1$-$N_1$-$P_2$-$N_2$-$P_3$-$N_3$, or the P bits and the B bits may be separated, such as $P_1$-$P_2$-$P_3$-$N_1$-$N_2$-$N_3$.

The order may be predetermined, and thus, designated by the radio access network and communicated to the terminal device 101 so that it may know the arrangement of the P bits and B bits to demodulate and decode the transmission. Alternatively, the order of the P bits and B bits may be detected by terminal device 101, e.g., a set of P bits may always be less than a set of B bits so that terminal device 101 may be able to distinguish between the types of bits.

For example, a transmission may be modulated according to an encoding scheme, such as, Orthogonal Frequency-Division Multiplexing (OFDM), including single carrier frequency-division multiple access (SC-FDMA), single carrier OFDM (SC-OFDM), filter bank multicarrier (FBMC), orthogonal frequency-division multiple access (OFDMA), etc. 3gPP NR (New Radio) may also be used by allocating the OFDM carrier data bit vectors to the corresponding symbol resources.

Thus, each OFDM carrier of each OFDM symbol may be modulated in accordance with a constellation representing "k" bits, such as, binary phase-key shifting (BPSK) (where k=1-bit), quadrature phase-shift keying (QPSK) (where k=2 bits), QAM-16 (where k=4 bits), QAM-64 (where k=6 bits), QAM-256 (where k=8 bits), etc. In the case of 3D modulation, the separation of the "k" data bits (e.g., the effective transmission) may be performed independently per OFDM carrier into i.) "m<k" bits (e.g., where m may be the truncated version of the transmission) used for the transmission source associated with the distinguishing transmission feature, e.g., a selected transmitter (e.g., a small cell of the plurality of network access nodes assigned a predefined number for identification purposes, such as 0, 1, 2, etc., which radio access network 100 may use for coordinating transmissions in accordance with the distinguishing transmission features) and ii.) "k–m" bits used for a modulation of reduced order. If, for example, for an effective transmission according to OFDM, where k=8, a QAM-256 symbol may be used per OFDM carrier.

For 3D modulation with beam hopping, one transmission source, e.g., a network access node, associated with a distinguishing transmission feature out of the $2^m$ plurality of network access nodes, with for example, m=2 small cells, may be selected for transmission. Then, "m" bits (e.g., the digital bit pattern) are modulated as the selection of the transmission source associated with a distinguishing transmission feature, e.g., a small cell or other network device including a transmitter, such as, an eNB, Citizen Broadband Service Device, etc., and only a modulation order for "k–m" bits may be required for the OFDM carrier. As an example, with k=8 and m=2, the modulation order would be reduced from QAM-256 to QAM-64. For the transmission source associated with the distinguishing transmission feature, e.g., the small cell or other network device, transmitter such as eNB, Citizen Broadband Service Device, etc., a specific number, e.g., the digital bit pattern or another identifier that radio access network 100 may use to uniquely identify each transmission source, may be allocated to each transmission source, e.g., the plurality of network access nodes. For example, with m=2, m bits may be modulated into the selection of one out of $2^m$ transmission sources (m=2, then $2^2$=4 transmission sources). The selection of the particular transmission source for transmission may correspond to the identifier, which may be associated with a particular digital bit pattern. For example, a plurality of network access nodes that have been selected for 3D modulation with beam hopping may be assigned a number "0", another the number "1", and, in this example, with the final transmission source assigned number "3". The identifier may, however, be any other character or identifying system that may uniquely identify each of the plurality of network access nodes. This allocation of a number may differ for each (group of) receiver(s) intended to receive the transmission from the transmission source with the distinguishing transmission feature, e.g., a network access node of the plurality of network access nodes, i.e., a given small cell may have a different "small cell number" for different receivers. Also, "m" may differ for different (groups of) receiver(s).

Accordingly, each transmission source may construct an OFDM symbol with a carrier amplitude of zero (i.e., no signal), except for the carriers which are allocated to the specific transmission source that is to transmit to a particular receiver, for example, the transmission source associated with the particular "m bits" vector upon which carrier, the remaining "k–m" bits are modulated using the appropriate constellation order.

In addition, for controlling the transmission to the terminal device 101, the respective OFDM symbols that may be transmitted to terminal device 101 may be modified independently by each of the various $2^m$ transmission sources, e.g., the network access nodes of the plurality of network access nodes, and accordingly, may be synchronized in time and frequency when transmitting to terminal device 101. For CP-OFDM, OFDM utilizing a cyclic prefix, a buffer may be used in the cyclic prefix to allow for deviations in time synchronization.

The training sequence may be a predefined transmission known by the terminal device 101 and the radio access network 100. The training sequence may, for example, be a reference signal, or other transmission used to estimate a propagation channel or make measurements. Terminal device 101 may transmit the training sequence, which may be received at the available network access nodes. Radio access network 100 may then use the received training sequence to determine a distinguishing transmission feature from each network access node, based on, for example, the propagation channel or a signal metric. Likewise, available network access nodes may transmit a training sequence to terminal device 101, and terminal device 101 may determine the distinguishing transmission feature from each network access node.

The training sequences may allow the terminal device 101 to efficiently and quickly identify the corresponding communication channels of available network access nodes, and, therefore, to decisively differentiate between the various channels. The training sequences may be short and may allow for efficient identification of the various SVD decompositions of the channel matrices, thereby limiting communication resource waste to a minimum. The demodulation reference signals (DMRS) may be used to estimate the effective channels of the available network access nodes from the training sequence. The channel identification may be done within at least one TTI (Time Transmission Interval).

Implementing a 3D modulation with beam hopping system in a radio access network, e.g., a 5G system architecture including NFV and SON, may involve the following factors for the MAC (Media Access Control), RLC (Radio Link Control), and other higher layers. First, the system would be enhanced by selection of the optimal subset of network access nodes available to the terminal device 101, which may be based on a number of parameters, such as, location, SINR, and mobility, etc. Secondly, using the training sequence to quickly and efficiently identify communication channels and to decisively differentiate between the various channels. And, finally, determining the appropriate timing and triggering for channel identification and for dynamic utilization of the 3D modulation with beam hopping system.

Figure 9A:
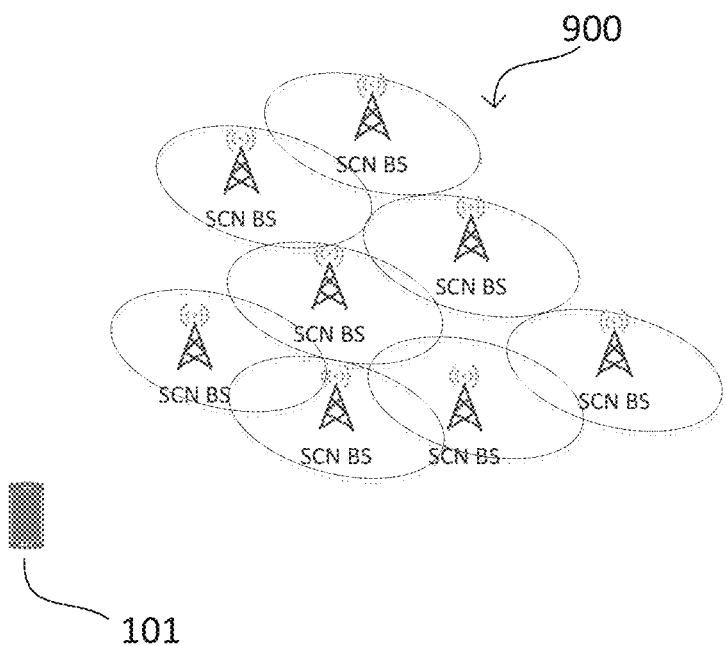
FIGS. 9A & 9B show selection of a plurality of network access nodes.

As shown in FIG. 9A, terminal device 101 may have a plurality of available network access nodes 900 to utilize for the 3D modulation with beam hopping system. However, each network access node of the plurality of available network access nodes may not be ideal to implement the system for a variety of factors. For example, while each network access node theoretically has a distinguishing transmission feature, terminal device 101 may not be able to efficiently differentiate between some channel characteristics if they are too similar. Thus, a subset of the available network access nodes may be preferable.

Furthermore, the addition of network access nodes, while reducing the computational complexity of the transmission, increases overhead computational complexity as terminal device 101 must maintain an active connection with each of the network access nodes and an association with a distinguishing transmission feature for each. Therefore, distinguishing transmission features, or network access nodes having a particular distinguishing transmission feature, may be selected to implement a subset of the available network access nodes 900 for the system. Thus, a distinguishing transmission feature may be selected on the ability of the terminal device 101 to quickly and easily identify the distinguishing transmission feature from the transmission.

Figure 9B:
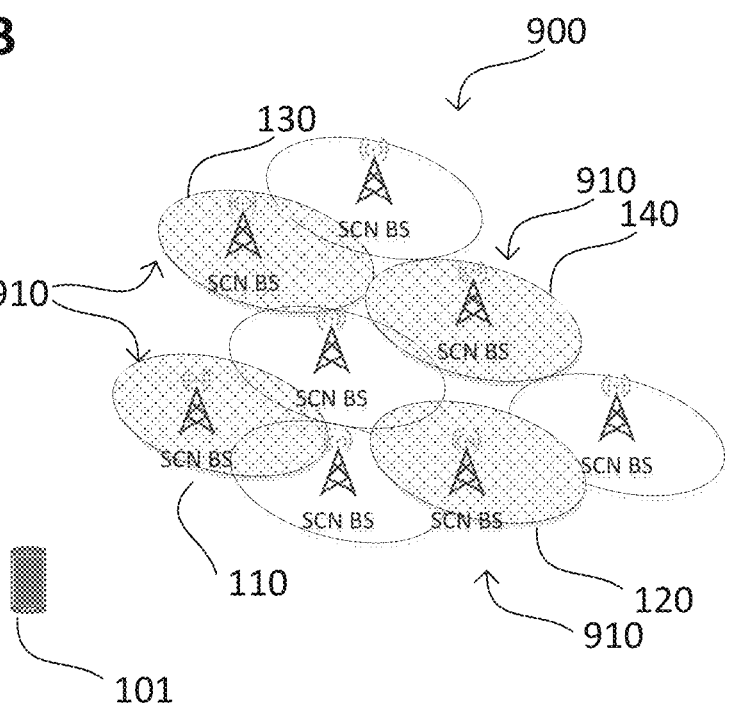

Therefore, from the available network access nodes 900 a subset may be selected based on various measurable parameters, such as distinct transmission frequencies, a location metric, e.g., signal power; signal quality, e.g., SINR, synchronization errors, and channel correlation. As shown in FIG. 9B, a plurality of network access nodes 910, e.g., including network access node 110, network access node 120, network access node 130, and network access node 140, may be selected from the available network access nodes 900.

With regard to channel correlation, the plurality of network access nodes 910 may be selected based on those network access nodes having a channel impulse response that can be differentiated decisively and quickly by terminal device 101. The plurality of network access nodes 910 may then be selected based on singular-value-decomposition (SVD) optimization that selects a network access node so that the power difference in the channel matrix sub-space is maximized and an optimum differentiation of all channels may be achieved.

Therefore, the selection of the plurality of network access nodes 910 may be optimized by selecting each network access node of the plurality of access nodes 910 having a channel difference from other channels of the available network access nodes 900 greater than a noise variance level among the available network access nodes 900. Accordingly, it may be assumed the difference in the respective channels of the available network access nodes 900 is due to the uniqueness of the channels themselves, e.g., a distinguishing transmission feature, and is not due to any noise variance. Terminal device 101 may, therefore, be able to efficiently distinguish between such channels. The channel difference may be defined as a Euclidean distance of a particular network access node channel greater than the noise variance level, as will be discussed in detail below.

This relationship may be defined in accordance with the following notation. The base band signal is described using complex base band notation and using matrix vector calculus. Discrete-time variables are denoted by vectors in lower case characters with bold face italics. Complex values are underlined. Additionally, $(\ )^H$ denotes the Hermitian of a vector or a matrix, "I" is the identity matrix and $E\{\ \}$ gives the expectation value of given random variables. $\|\ \|$ is the norm operation and $\langle\ \rangle$ is the inner product operation, while "!" is the factorial operation.

Considering an LTE Rel. 12 system and beyond (e.g., a MIMO-OFDM system) with $N_{subc}$ subcarriers, $N_T$ transmit antennas, and $N_R$ receive antennas, we represent the received signal at terminal device 101 in k-th subcarrier of a 3D modulation with beam hopping transmission with $$\underline{r}[k] = \underbrace{\underline{H}_j[k]\underline{p}_j}_{\underline{g}_j}\underline{d}[k] + \underline{n}[k], \ j \in \{1, \ldots, L\}. \quad (1)$$

Here j is the index of the active small cell in the k-th subcarrier. Moreover, L denotes the number the plurality of network access nodes 910. $\underline{r} \in \mathbb{C}^{N_R \times 1}$ is the received signal vector at the target terminal device 101 in the k-th subcarrier. $\underline{H}_j \in \mathbb{C}^{N_R \times N_T}$ is the MIMO channel matrix seen by the target terminal device 101. $\underline{p}_j \in \mathbb{C}^{N_T \times 1}$ and $\underline{d} \in \mathbb{C}$ are the precoding vector and transmitted symbol for the target terminal device 101, respectively, where $E\{\underline{d}^H \underline{d}\} = E_d$. Where $E_d$ is the average symbol energy. $\underline{g}_j \in \mathbb{C}^{N_R \times 1}$ is the effective channel between the terminal device 101 and the network access node with index j. $\underline{n} \in \mathbb{C}^{N_R \times 1}$ is the zero mean circularly symmetric complex Gaussian random noise vector with $\underline{n} \sim CN(0, \sigma_n^2 I)$. Where $\sigma_n^2$ is the noise variance.

The maximum likelihood (ML) receiver may be used to detect the transmitted QAM symbol and the index of the active network access node, which in turn leads to retrieving the transmitted bits. The ML receiver estimates the transmitted symbol and the network access node index jointly as follows in equation (2):

$$[\hat{j}, \hat{d}] = \arg\min_{i,j}\{\|\underline{r}[k] - \underline{g}_j[k]d_i\|^2\}. \quad (2)$$

Where $i = \{1, \ldots, M\}$, where M denotes the QAM modulation order.

The following may be used to select the plurality of network access nodes to achieve the required throughput in the system. The proposed implementation to select the modulation order and the number of active network access nodes in the plurality of network access nodes 910 may be as follows:

1) The effective channels of all W available network access nodes 900 may be estimated using the joint least squares channel estimation (JLSCE) as follows:

$$\begin{bmatrix} \underline{\hat{g}}_1^T \\ \underline{\hat{g}}_2^T \\ \underline{\hat{g}}_3^T \end{bmatrix} = \underline{M}\underline{Y}^T = \underline{M}\underline{X}\begin{bmatrix} \underline{g}_1^T \\ \underline{g}_2^T \\ \underline{g}_3^T \end{bmatrix} + \underline{N}_n^T;$$

wherein $\underline{g}_1 \in \mathbb{C}^{N_R \times 1}$ denotes the effective channel of the serving network access node and $\underline{g}_2, \underline{g}_3 \in \mathbb{C}^{N_R \times 1}$ are the effective channel of the second and the third interfering network access nodes, respectively. According to the pseudoinverse theorem, the $\underline{M}\,\underline{X}$ is an identity matrix with the dimensions of $N_R \times N_R$. Furthermore, $\underline{N}_n \in \mathbb{C}^{3 \times N_R}$ is the additive white Gaussian noise (AWGN) matrix.

2) Estimating the noise covariance matrix $\underline{\hat{R}_n}$, which may be calculated according to:

$$\underline{\hat{R}_n} = \frac{1}{|S_{DMRS}|}\left(\left(\underline{Y} - \sum_{j=1}^{N_{cell}} \underline{\hat{g}_j} x_j^T\right)\left(\underline{Y} - \sum_{j=1}^{N_{cell}} \hat{g}_j x_j^T\right)^H\right).$$

3) Finding the noise variance $\sigma_n^2$ using the estimated noise covariance matrix.
4) Calculating the Euclidean distance $\lambda$ among all the estimated effective channels as follows $$\lambda_{x,y} = \|g_x[k] - g_y[k]\|^2, x,y \in \{1, \ldots, N\}. \quad (3)$$

Where N is the number of available network access nodes 900.

5) Choosing network access nodes using the following metric (derived below)

$$\lambda_{x,y} = \|g_x[k] - g_y[k]\|^2 > \sigma_n^2. \quad (4)$$

6) Calculating the post-SNR of the L selected network access nodes in step 5, where L is $2^n$, $n \in \{1, \ldots, 3\}$.
7) Using the output of step 6 to choose a suitable modulation coding schemes (MCS) from applicable communication protocols, e.g., the table given in 3GPP TR 36.213, 2016.
8) The evolution of the channel impulse responses for the selected plurality of network access nodes 910 may be tracked at each TTI, which may fulfill applicable communication protocols, such as the 3GPP standard, using the metric in equation (4). In case the level of differentiation in the respective effective channels changes to be less than $\sigma_n^2$, a new identification of suitable small cells is triggered and step 1 may be repeated.

The metric of equation (4) is derived as follows. Applying an optimal detector given in equation (2), the aim of the derivation is to find the minimum Euclidean distance that is required to differentiate among the effective channels of the available network access nodes 900 and, therefore, enable detection of the transmitting network access node at the k-th subcarrier, thereby leading to retrieval of the transmitted bits. By taking the mean of the Euclidean distance term from equation (2):

$$\lambda_{x,y,i} = E\{\|\underline{r}[k] - g_y[k]\underline{d}_i\|^2\}. \quad (5)$$

Substituting equation (1) in equation (5) results in:

$$\lambda_{x,y,i} = E\{\|g_x[k]\underline{d}_i + \underline{n}[k] - g_y[k]\underline{d}_i\|^2\}. \quad (6)$$

According to the cosine law, $$\lambda_{x,y,i} = E\{\|g_x[k]\underline{d}_i - g_y[k]\underline{d}_i\|^2 + \|\underline{n}[k]\|^2 + 2\Re\{\langle g_x[k]\underline{d}_i - g_y[k]\underline{d}_i \underline{n}[k]\rangle\}\}. \quad (7)$$

Equation (7) can be simplified to:

$$\lambda_{x,y,i} = E\{\|g_x[k]\underline{d}_i - g_y[k]\underline{d}_i\|^2\} + E\{\|\underline{n}[k]\|^2\} + 2\Re\{E\{\langle g_x[k]\underline{d}_i - g_y[k]\underline{d}_i \underline{n}[k]\rangle\}\}. \quad (8)$$

According to the inner product, the above equation may be written as:

$$\lambda_{x,y,i} = e\{\|g_x[k]\underline{d}_i - g_y[k]\underline{d}_i\|^2\} + E\{\|\underline{n}[k]\|^2\} + 2\Re\{E\{(g_x[k]\underline{d}_i - g_y[k]\underline{d}_i)^H(\underline{n}[k])\}\}. \quad (9)$$

Since $(g_x[k]\underline{d}_i - g_y[k]\underline{d}_i)$ and n[k] are statistically independent, then:

$$\lambda_{x,y,i} = E\{\|g_x[k]\underline{d}_i - g_y[k]\underline{d}_i\|^2\} + E\{\|\underline{n}[k]\|^2\} + 2\Re\{0\}. \quad (10)$$

Applying the cosine law and the inner product theorem to simplify the first term of equation (10), the equation becomes:

$$\lambda_{x,y} = E\{(g_x[k]\underline{d}_i)^H(g_x[k]d_i)\} + e\{(g_y[k]\underline{d}_i)^H(g_y[k]\underline{d}_i)\} - 2\Re\{E\{(g_x[k]\underline{d}_i)^H(g_y[k]\underline{d}_i)\}\} + E\{\|\underline{n}[k]\|^2\}. \quad (11)$$

Since $E\{d^H d\} = E_d$, where $E_d = 1$ based on the average power of the symbols being normalized to one, then $$\lambda_{x,y} = E\{(g_x[k])^H(g_x[k])\} + E\{(g_y[k])^H(g_y[k])\} - 2\Re\{E\{(g_x[k])^H(g_y[k])\}\} + E\{\|\underline{n}[k]\|^2\}. \quad (12)$$

According to the cosine law and the inner product theorem, $$\lambda_{x,y} = \|g_x[k] - g_y[k]\|^2 + E\{\|\underline{n}[k]\|^2\}. \quad (13)$$

Where $E\{\|\underline{n}[k]\|^2\} = \sigma_n^2$ $$\lambda_{x,y} = \|g_x[k] - g_y[k]\|^2 + \sigma_n^2. \quad (14)$$

Concluding from equation (14), it is possible to differentiate among the effective channels of different network access nodes when $$\|g_x[k] - g_y[k]\|^2 > \sigma_n^2. \quad (15)$$

The derived metric in equation (15) can be used to optimize selection of the plurality of network access nodes 910 from the available network access nodes 900, as described above.

As described above, the plurality of network access nodes 910 may be reselected if the effective channel of at least one of the network access nodes is less than or equal to the noise covariance. The plurality of network access nodes 910 may additionally or alternatively be updated based on a measured parameter changing, as well as a regular or irregular period of time. As discussed above, the measured parameter may be based on channel correlation, a location metric, signal quality, and/or a synchronization error.

Switching between various modulation orders may be done within at least one TTI. Depending on the suitability of the available network access nodes 900, the system may be dynamically implemented, i.e., switched on/off depending on the factors at hand.

With regard to a location metric, the location of the terminal device 101 in relation to network access nodes may be used as the signal received by terminal device 101 can be exposed to path-loss and penetration-loss due to obstacles. Therefore, reselection, or selection updating, may be initiated when mobility of the terminal device 101 exceeds a predetermined threshold, which may, for example, be calculated from a computed received power at the terminal device 101 for the plurality of network access nodes 910. Selection of the plurality of access nodes 901 may also be based on a computed received power from an available access node, e.g., from the available access nodes 900, based on a predetermined received signal power, e.g., as may be used in LTE-A for cell selection and cell reselection in accordance with 3GPP TR 36.214, 2016, which utilizes the reference signal receiving power (RSRP) and reference signal receiving quality (RSRQ).

Additionally or alternatively, the SINR may be used for updating the plurality of network access nodes 910. Increased interference and noise levels in a radio access system lead to decreases in system performance and, therefore, increases in the BER and PER of the system. To maintain system performance at high interference and noise levels, the transmission robustness may be increased, for example, by decreasing the modulation order for transmissions. In general, decreasing transmission modulation order, however, has the effect of decreasing system data throughput. With the 3D modulation and beam hopping system, the overall system performance and throughput may be maintained at high interference and noise levels by reducing the modulation order (QAM) to the requisite SINR level according to the relevant communications protocols, such as 3GPP TR 36.213, 2016, and increasing the number of the plurality of access nodes 901. Accordingly, terminal device 101 may perform intermittent interference and noise measurements and accordingly update the selection of network access nodes 910 to maintain system throughput. Such measurements may be based on demodulation reference signals (DMRS) and Channel State Information-Reference Signals (CSI-RS) in LTE-A communications in accordance with 3GPP TR 36.211, 2015.

Furthermore, synchronization errors between transmitters and receivers may be used as a parameter for updating the plurality of network access nodes 910. For example, coherent demodulation for QAM constellations in LTE-A systems require that local oscillators at the transmitter and the receiver have substantially the same carrier frequency and phase. In addition, synchronized sampling clock frequencies and phases are also required at the transmitter and the receiver to demodulate the received signal correctly. A mismatch between the transmitter and the receiver leads to synchronization errors that degrade higher QAM modulation orders, whereas lower QAM modulation orders are more robust against synchronization errors as the distance between the QAM symbols is greater. Therefore, higher order modulation schemes require complex synchronization algorithms, which in turn necessitate expensive and complicated hardware design to ensure performance levels at the receiver end. 3D modulation with beam hopping systems may be used to decrease modulation order and preserve (or enhance) system throughput. Therefore, the plurality of network access nodes 910 may be updated to decrease the modulation order, thereby simplifying synchronization algorithms having higher synchronization error values while achieving the required performance on the receiver side.

Figure 10A:
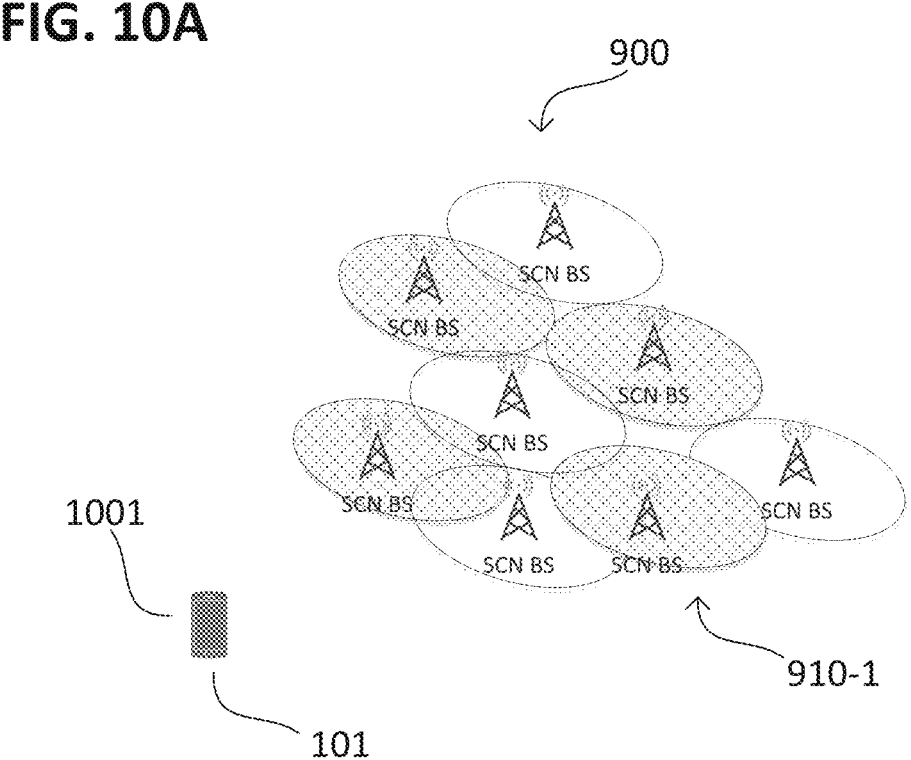
FIGS. 10A & 10B show updating the selection of a plurality of network access nodes.
Figure 10B:
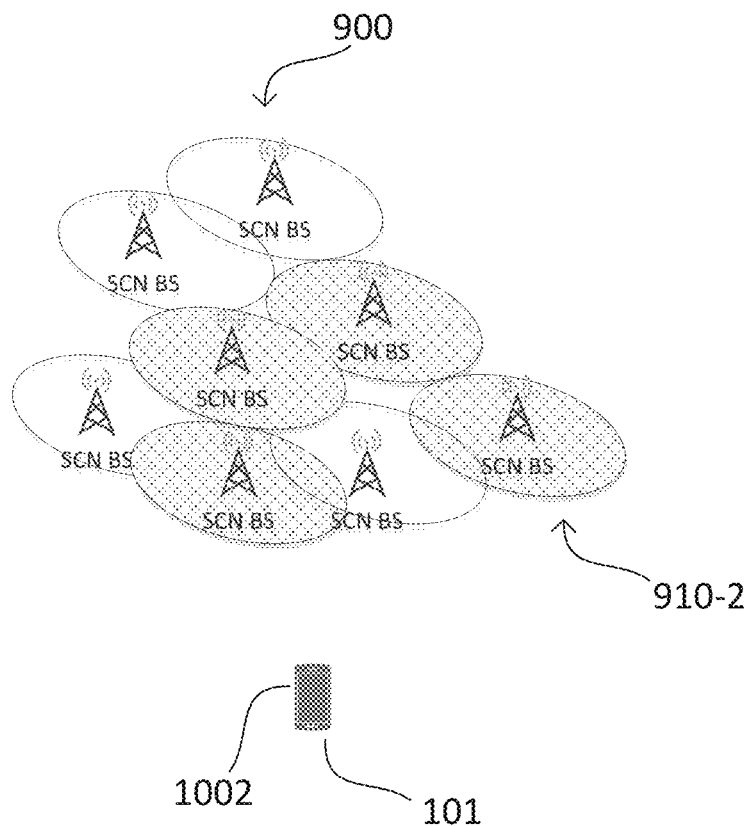

Thus, as shown in FIG. 10A, terminal device 101 may have selected a plurality of network access nodes 910-1 from the available access nodes 900 in a first state 1001, whereas in FIG. 10B, terminal device 101 may be in a second state 1002, different from first state 1001, in which a measured parameter may have changed, thus triggering an update of the plurality of network access nodes 910-1, which may be reselected as the plurality of network access nodes 910-2. Any one or more of the above measured parameters may have changed to prompt the update and reselection. For example, first state 1001 may be a first location and second state 1002 may be a second location having a distance greater than a predetermined threshold. Terminal device 101 may thus keep track of the measured parameters and trigger an update if it is determined the measured parameters have changed, for example, if the change is greater than a predetermined threshold.

Figure 11:
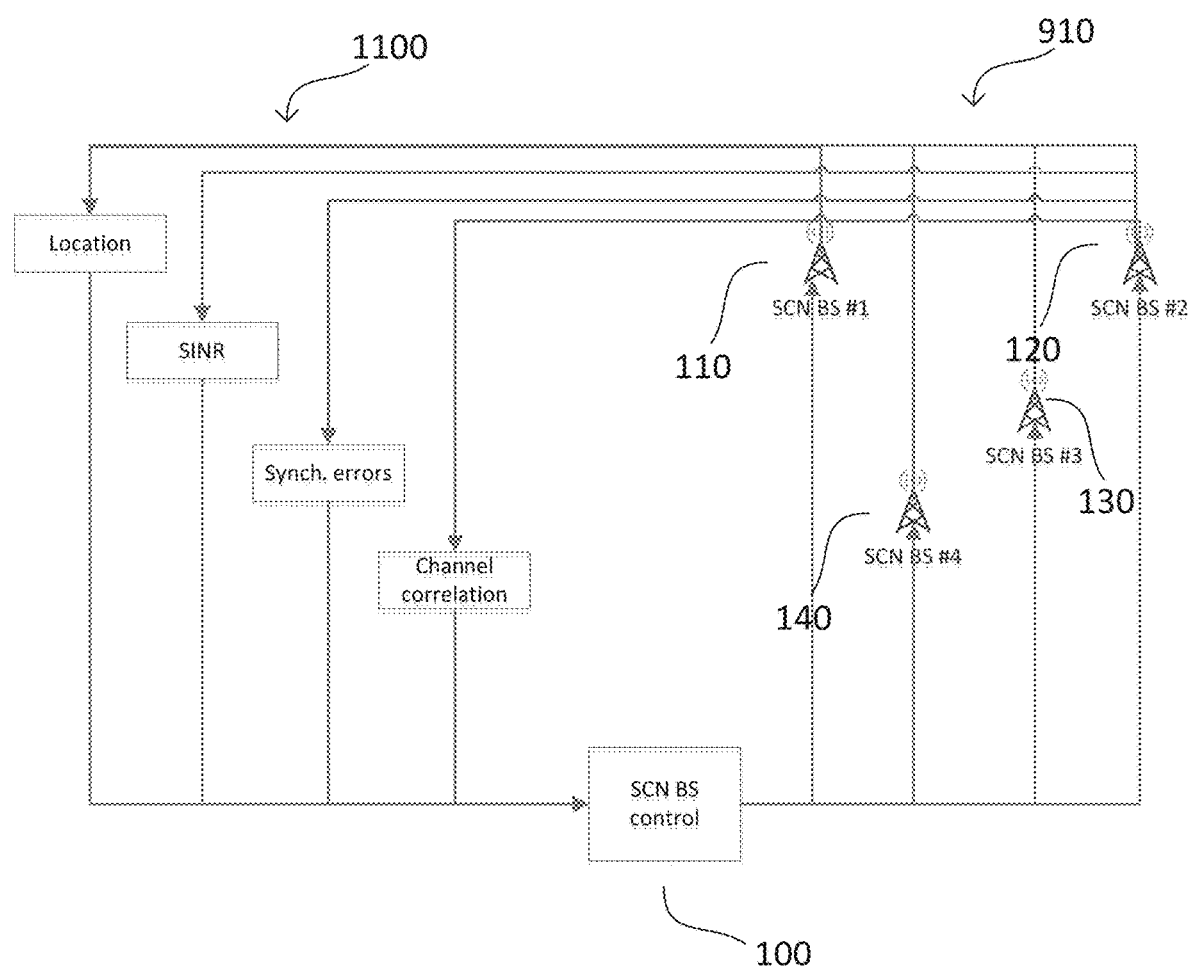
FIG. 11 shows updating the selection of a plurality of network access nodes by the radio access network.

Likewise, radio access network 100 may keep track of the measured parameters 1100 as shown in the exemplary diagram of FIG. 11. As an example, the plurality of network access nodes 910 may include four network access nodes including network access node 110, network access node 120, network access node 130, and network access node 140, which may be coupled to a control node of radio access network 100 that may coordinate communications across radio access network 100, e.g., higher layers of the communications protocol of radio access network 100. Therefore, radio access network 100 may monitor the measured parameters 1100 to determine if there has been a change, e.g., greater than a predetermined threshold, and correspondingly update the plurality of network access nodes 901.

It is noted here that the selection of the plurality of access nodes 901 may be performed by the radio access network 100 or by the terminal device 101. For example, the available network access nodes 900 may transmit a training sequence to terminal device 101, which may then select the distinguishing transmission features, e.g., corresponding to a particular network access node, and report a list or preferences to radio access network 100, which may then implement the 3D modulation with beam hopping system. Terminal device 101 may thus send a control signal via a control channel to inform radio access network 100 about the selection of the plurality of network access nodes 910.

The transmission of the selection of the plurality of network access nodes 910 may have an overhead of $\rho_{bits}$ in the uplink to radio access network 100 that may be calculated as $$\rho_{bits} = \frac{W!}{(L!)(W-L)!},$$

where W is the number of available network access nodes 900 and L is the number of the selected plurality of network access nodes 910. Therefore, with a decreasing number of available network access nodes and an increasing number of selected network access nodes, there are a decreasing number of $\rho_{bits}$ in the uplink. In the other direction, terminal device 101 may transmit the training sequence and radio access network 100 may select the plurality of network access nodes 910 from the transmission received at the available network access nodes 900.

Figure 12:
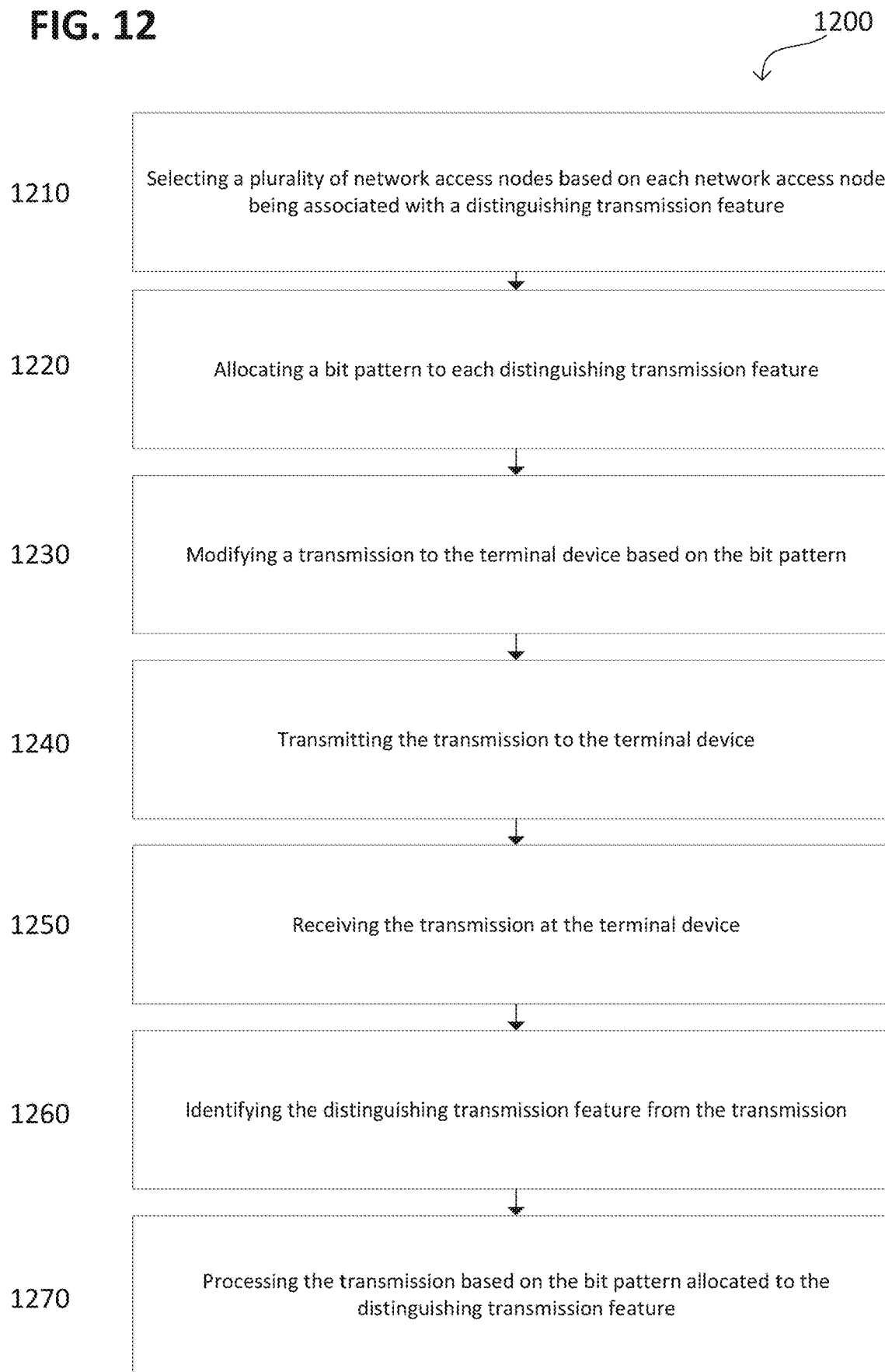
FIG. 12 shows a flow chart of a method for controlling communications between a radio access network and a terminal device.

Accordingly, in an aspect of the disclosure, FIG. 12 may show a method 1200 for controlling communication between a radio access network 100 and a terminal device 101. Method 1200 may include: in 1210, selecting a plurality of network access nodes 910 based on each network access node having a distinguishing transmission feature; in 1220, allocating a digital bit pattern to each distinguishing transmission feature; in 1230, modifying a transmission to the terminal device 101 based on the digital bit pattern; in 1240, transmitting the transmission to the terminal device 101; in 1250, receiving the transmission at the terminal device; in 1260, identifying the distinguishing transmission feature from the transmission; and, in 1270, processing the transmission based on the digital bit pattern allocated to the distinguishing transmission feature. Method 1200 may be implemented by a non-transitory computer readable medium having computer executable instructions that cause one or more processing circuits to perform method 1200. The processing circuits may be separately located, e.g., in radio access network 100 and terminal device 101. Likewise, method 1200 may be performed by any means, e.g., any structure, consistent, mutatis mutandis, with the disclosure.

The plurality of network access nodes 910 may be selected from a plurality of available network access nodes 900 that are detectable by the terminal device 101. The plurality of network access nodes 910 may be part of a small cell network and may operate in a spectrum above 6 GHz in a mmWave band. Method 1200 may further include optimizing selecting the plurality of network access nodes 910 based on each network access node of the plurality of network access nodes 910 having a channel difference from other channels of the plurality of available network access nodes 900 greater than a noise variance level among the plurality of available network access nodes 900. The channel difference may be a Euclidean distance greater than the noise variance. The Euclidean distance may be defined by $\|g_x[k] - g_y[k]\|^2$, $x,y \in \{1, \ldots, N\}$.

In addition, method 1200 may adjust a modulation order of the transmission based on the digital bit pattern, such as the modulation order being adjusted from an effective modulation order to a transmission modulation order based on the digital bit pattern. For example, depending on a number of characters forming the digital bit pattern, e.g., part 703, the modulation order is adjusted from an effective modulation order, e.g., QAM-256 for 8 bits as in bit vector 810, to a transmission modulation order, e.g., QAM-64 for 6 bits as in bit vector 811, based on the digital bit pattern, e.g., if the digital bit pattern contains two bits. Therefore, the effective modulation order may be greater than the transmission modulation order. In an aspect of the disclosure, a maximum possible modulation order may be initially determined based on signal measurements. This modulation order may vary in differing signal environments based on differing signal measurements. Accordingly, radio access network 100 and terminal device 101 may be communicating at one modulation order at one time period, during which the signal environment may change so that conventionally, the modulation order must be reduced. However, as discussed above, the effective modulation order may be maintained in such circumstances while the transmission modulation order is reduced to the new maximum possible modulation order under the new signal conditions in the new time period. Alternatively, the effective modulation order may be greater than the maximum possible modulation order (over the air interface), as the transmission modulation order may be the same as the maximum possible modulation order, however, the effective modulation order may be greater than the transmission modulation order in accordance with method 1200.

Accordingly, radio access network 100 may communicate allocation of the digital bit pattern allocated to each distinguishing characteristic to the terminal device 101. Radio access network 100 may allocate the digital bit patterns to respective network access nodes of the plurality of network access nodes 910, which may each have a distinguishing transmission feature. Thus, terminal device 101 may be able to associate a particular distinguishing transmission feature with a particular digital bit pattern for processing.

For transmitting the transmission to terminal device 101, radio access network 100 may select a network access node of the plurality of network access nodes 910 for the transmission based on the digital bit pattern. The digital bit pattern may be composed of a predefined number of characters, or bits. Each network access node of the plurality of network access nodes 910 associated with a distinguishing transmission feature may be allocated a digital bit pattern. The network access nodes of the plurality of network access nodes 910 may each be allocated a unique digital bit pattern. For example, if the digital bit pattern "10" was removed from the transmission, the network access node having a distinguishing transmission feature allocated the digital bit pattern "10" would be selected to transmit the transmission to terminal device 101. Therefore, the transmission is modified from an effective transmission by removing the digital bit pattern associated with the distinguishing transmission feature from a predetermined position of the effective transmission. The transmission may then be a truncated version of the effective transmission.

Terminal device 101 may then identify the distinguishing transmission feature from the transmission by comparing each distinguishing transmission feature of the plurality of network access nodes 910 to the transmission until the distinguishing transmission feature is matched to the transmission, e.g., a particular transmission frequency or propagation channel. Upon identification, terminal device 101 may then add the digital bit pattern to the transmission in the predetermined position to recreate the effective transmission.

In method 1200, a training sequence may be transmitted from each network access node of the plurality of network access nodes 910 to the terminal device 101 to identify the distinguishing transmission feature. The distinguishing transmission feature may be at least one of a signal metric; a transmission frequency; and a channel metric. The signal metric may be based on at least one of a signal power and/or a signal quality. The signal quality may be based on at least one of a noise level and/or an interference level. The channel metric may be based on at least one of a channel estimation and a channel correlation.

In an aspect of method 1200, the plurality of network access nodes 910 may be updated based on a measured parameter changing. The measured parameter may be at least one of a location metric, for example a signal power, such as RSRP; a signal quality, which may be based on interference and noise measurements, such as a SINR and/or RSRQ; a synchronization error, and a channel correlation.

Figure 13:
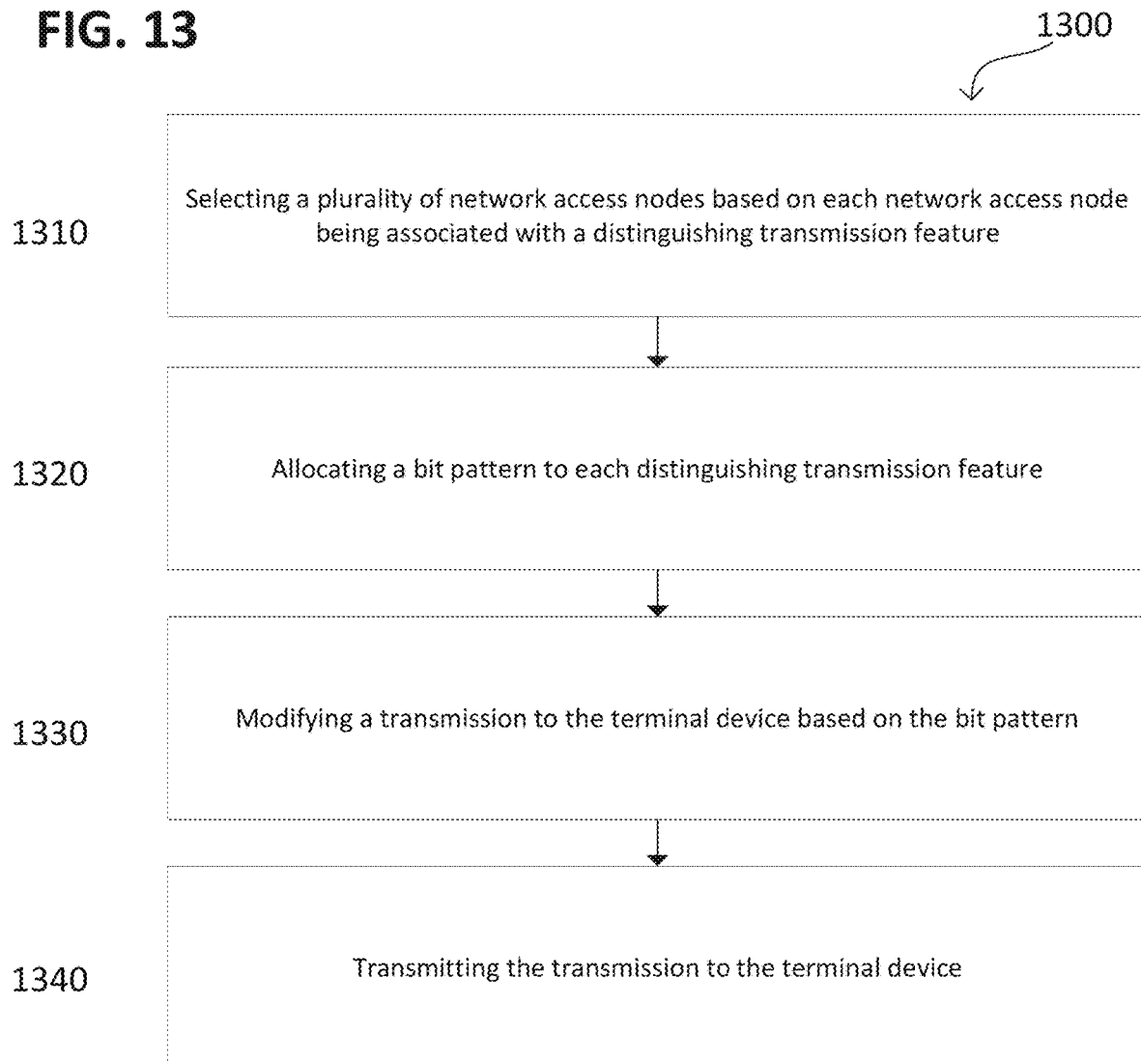
FIG. 13 shows a flow chart of a method for transmitting to a terminal device.

In an aspect of the disclosure, method 1300 in FIG. 13 may be for transmitting to a terminal device 101, e.g., from radio access network 100, and may include: in 1310, selecting a plurality of network access nodes based on each network access node having a distinguishing transmission feature; in 1320, allocating a digital bit pattern to each distinguishing transmission feature; in 1330, modifying a transmission to the terminal device 101 based on the digital bit pattern; and, in 1340, transmitting the transmission to the terminal device 101. Method 1300 may be implemented by a non-transitory computer readable medium having computer executable instructions that cause a processing circuit to perform method 1300. Likewise, method 1300 may be performed by any means, e.g., any structure, consistent, mutatis mutandis, with the disclosure.

The plurality of network access nodes 910 may be selected from a plurality of available network access nodes 900 that are detectable by the terminal device 101. The plurality of network access nodes 910 may be part of a small cell network and may operate in a spectrum above 6 GHz in a mmWave band. Method 1300 may further include optimizing selecting the plurality of network access nodes 910 based on each network access node of the plurality of network access nodes 910 having a channel difference from other channels of the plurality of available network access nodes 900 greater than a noise variance level among the plurality of available network access nodes 900. The channel difference may be a Euclidean distance greater than the noise variance. The Euclidean distance may be defined by $\|g_x[k] - g_y[k]\|^2$, $x,y \in \{1, \ldots, N\}$.

In addition, method 1300 may adjust a modulation order of the transmission based on the digital bit pattern, such as the modulation order being adjusted from an effective modulation order to a transmission modulation order based on the digital bit pattern. For example, depending on a number of characters forming the digital bit pattern, e.g., part 703, the modulation order is adjusted from an effective modulation order, e.g., QAM-256 for 8 bits as in bit vector 810, to a transmission modulation order, e.g., QAM-64 for 6 bits as in bit vector 811, based on the digital bit pattern, e.g., if the digital bit pattern contains two bits. Therefore, the effective modulation order may be greater than the transmission modulation order. In an aspect of the disclosure, a maximum possible modulation order may be initially determined based on signal measurements. This modulation order may vary in differing signal environments based on differing signal measurements. Accordingly, radio access network 100 and terminal device 101 may be communicating at one modulation order at one time period, during which the signal environment may change so that conventionally, the modulation order must be reduced. However, as discussed above, the effective modulation order may be maintained in such circumstances while the transmission modulation order is reduced to the new maximum possible modulation order under the new signal conditions in the new time period. Alternatively, the effective modulation order may be greater than the maximum possible modulation order (over the air interface), as the transmission modulation order may be the same as the maximum possible modulation order, however, the effective modulation order may be greater than the transmission modulation order in accordance with method 1200.

Accordingly, radio access network 100 may communicate allocation of the digital bit pattern allocated to each distinguishing characteristic to the terminal device 101. Radio access network 100 may allocate the digital bit patterns to respective network access nodes of the plurality of network access nodes 910, which may each have a distinguishing transmission feature. Thus, terminal device 101 may be able to associate a particular distinguishing transmission feature with a particular digital bit pattern for processing.

For transmitting the transmission to terminal device 101, radio access network 100 may select a network access node of the plurality of network access nodes 910 for the transmission based on the digital bit pattern. The digital bit pattern may be composed of a predefined number of characters, or bits. Each network access node of the plurality of network access nodes 910 associated with a distinguishing transmission feature may be allocated digital bit pattern. The network access nodes of the plurality of network access nodes 910 may each be allocated a unique digital bit pattern. For example, if the digital bit pattern "10" was removed from the transmission, the network access node having a distinguishing transmission feature allocated the digital bit pattern "10" would be selected to transmit the transmission to terminal device 101. Therefore, the transmission is modified from an effective transmission by removing the digital bit pattern associated with the distinguishing transmission feature from a predetermined position of the effective transmission. The transmission may then be a truncated version of the effective transmission.

In method 1300, a training sequence may be transmitted from each network access node of the plurality of network access nodes 910 to the terminal device 101 to identify the distinguishing transmission feature. The distinguishing transmission feature may be at least one of a signal metric; a transmission frequency; and a channel metric. The signal metric may be based on at least one of a signal power and/or a signal quality. The signal quality may be based on at least one of a noise level and/or an interference level. The channel metric may be based on at least one of a channel estimation and a channel correlation.

In an aspect of method 1300, the plurality of network access nodes 910 may be updated based on a measured parameter changing. The measured parameter may be at least one of a location metric, for example a signal power, such as RSRP; a signal quality, which may be based on interference and noise measurements, such as a SINR and/or RSRQ; a synchronization error, and a channel correlation.

Figure 14:
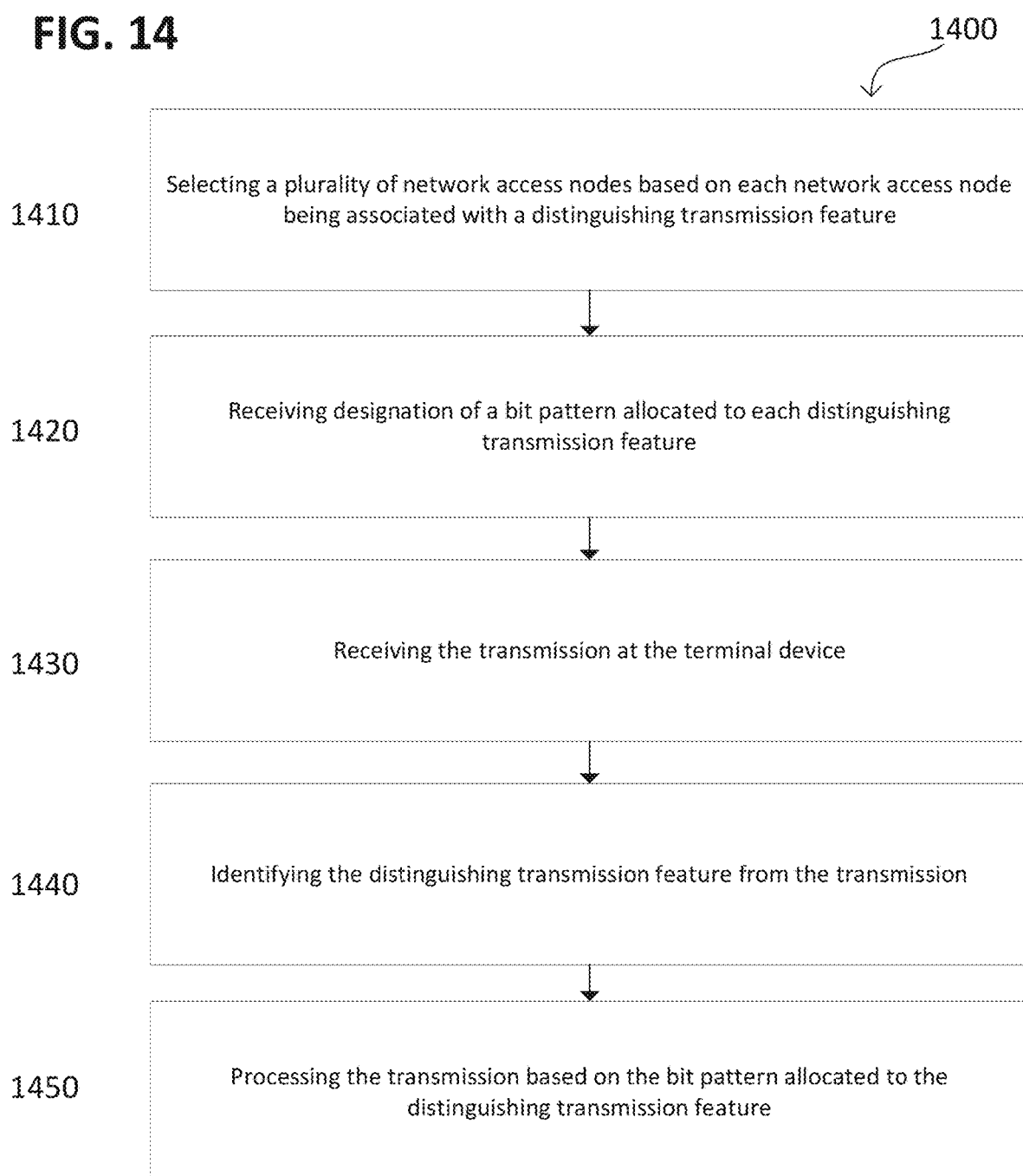
FIG. 14 shows a flow chart of a method for receiving a transmission from a radio access network.

In an aspect of the disclosure, method 1400 in FIG. 14 may be for receiving a transmission from a radio access network 100, method 1400 including: in 1410, selecting a plurality of network access nodes 910 based on each network access node having a distinguishing transmission feature; in 1420, receiving a digital bit pattern allocated to each distinguishing transmission feature; in 1430, receiving the transmission at the terminal device 101; in 1440, identifying the distinguishing transmission feature from the transmission; and in 1450, processing the transmission based on the digital bit pattern allocated to the distinguishing transmission feature. Method 1400 may be implemented by a non-transitory computer readable medium having computer executable instructions that cause one or more processing circuits to perform method 1400. Likewise, method 1400 may be performed by any means, e.g., any structure, consistent, mutatis mutandis, with the disclosure.

The plurality of network access nodes 910 may be selected from a plurality of available network access nodes 900 that are detectable by the terminal device 101. The plurality of network access nodes 910 may be part of a small cell network and may operate in a spectrum above 6 GHz in a mmWave band. Method 1400 may further include optimizing selecting the plurality of network access nodes 910 based on each network access node of the plurality of network access nodes 910 having a channel difference from other channels of the plurality of available network access nodes 900 greater than a noise variance level among the plurality of available network access nodes 900. The channel difference may be a Euclidean distance greater than the noise variance. The Euclidean distance may be defined by $\|g_x[k]-g_y[k]\|^2$, $x,y \in \{1, \ldots, N\}$.

In addition, method 1400 may include receiving designation of a modulation order of the transmission based on the digital bit pattern, such as the modulation order being adjusted from an effective modulation order to a transmission modulation order based on the digital bit pattern. Thus the transmission modulation is designated as the modulation order for the transmission. The designation of the modulation order may be utilized by terminal device 101 to receive the transmission from the radio access network. Radio access network 100 may transmit the designation to terminal device 101. For example, depending on a number of characters forming the digital bit pattern, e.g., part 703, the modulation order is adjusted from an effective modulation order, e.g., QAM-256 for 8 bits as in bit vector 810, to a transmission modulation order, e.g., QAM-64 for 6 bits as in bit vector 811, based on the digital bit pattern, e.g., if the digital bit pattern contains two bits. Therefore, the effective modulation order may be greater than the transmission modulation order. In an aspect of the disclosure, a maximum possible modulation order may be initially determined based on signal measurements. This modulation order may vary in differing signal environments based on differing signal measurements. Accordingly, radio access network 100 and terminal device 101 may be communicating at one modulation order at one time period, during which the signal environment may change so that conventionally, the modulation order must be reduced. However, as discussed above, the effective modulation order may be maintained in such circumstances while the transmission modulation order is reduced to the new maximum possible modulation order under the new signal conditions in the new time period. Alternatively, the effective modulation order may be greater than the maximum possible modulation order (over the air interface), as the transmission modulation order may be the same as the maximum possible modulation order, however, the effective modulation order may be greater than the transmission modulation order in accordance with method 1200.

Accordingly, terminal device 101 may receive the digital bit pattern allocated to each distinguishing characteristic. Radio access network 100 may allocate the digital bit patterns to respective network access nodes of the plurality of network access nodes 910, which may each have a distinguishing transmission feature. Thus, terminal device 101 may be able to associate a particular distinguishing transmission feature with a particular digital bit pattern for processing.

The digital bit pattern may be composed of a predefined number of characters, or bits. Each network access node of the plurality of network access nodes 910 associated with a distinguishing transmission feature may be allocated digital bit pattern. The network access nodes of the plurality of network access nodes 910 may each be allocated a unique digital bit pattern. For example, if the digital bit pattern "10" was removed from the transmission, the network access node having a distinguishing transmission feature allocated the digital bit pattern "10" would be selected to transmit the transmission to terminal device 101. Therefore, the transmission is modified from an effective transmission by removing the digital bit pattern associated with the distinguishing transmission feature from a predetermined position of the effective transmission. The transmission may then be a truncated version of the effective transmission.

Terminal device 101 may then identify the distinguishing transmission feature from the transmission by comparing each distinguishing transmission feature of the plurality of network access nodes 910 to the transmission until the distinguishing transmission feature is matched to the transmission, e.g., a particular transmission frequency or propagation channel. Upon identification, terminal device 101 may then add the digital bit pattern to the transmission in the predetermined position to recreate the effective transmission.

In method 1400, a training sequence may be transmitted from each network access node of the plurality of network access nodes 910 to the terminal device 101 to identify the distinguishing transmission feature. The distinguishing transmission feature may be at least one of a signal metric; a transmission frequency; and a channel metric. The signal metric may be based on at least one of a signal power and/or a signal quality. The signal quality may be based on at least one of a noise level and/or an interference level. The channel metric may be based on at least one of a channel estimation and a channel correlation.

In an aspect of method 1400, the plurality of network access nodes 910 may be updated based on a measured parameter changing. The measured parameter may be at least one of a location metric, for example a signal power, such as RSRP; a signal quality, which may be based on interference and noise measurements, such as a SINR and/or RSRQ; a synchronization error, and a channel correlation.

Figure 15:
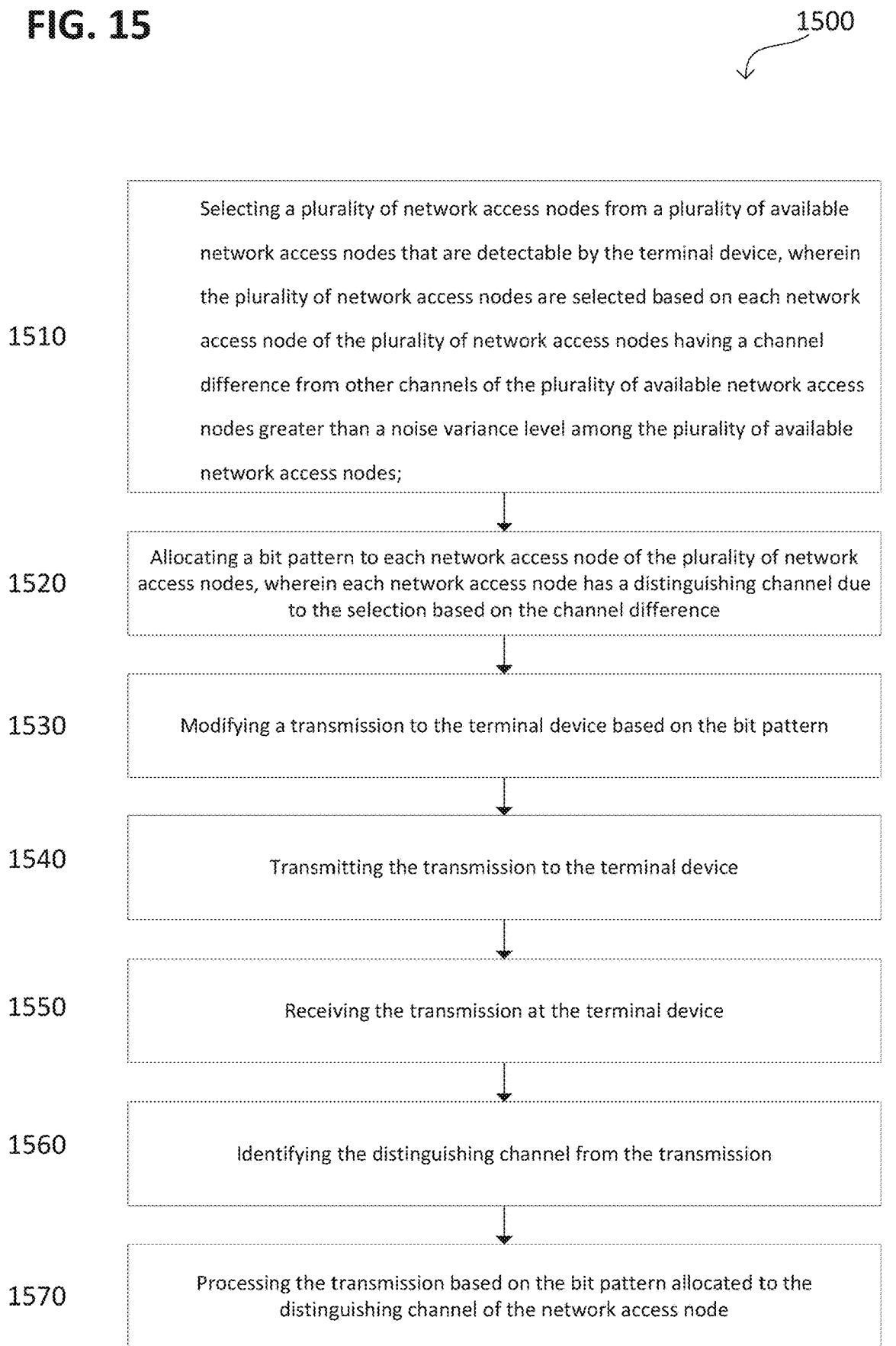
FIG. 15 shows a flow chart of a method for controlling communications between a radio access network and a terminal device.

In an aspect of the disclosure, method 1500 in FIG. 15 may be for controlling communications between a radio access network 100 and a terminal device 101, method 1500 including: in 1510, selecting a plurality of network access nodes 910 from a plurality of available network access nodes 900 that are detectable by the terminal device 101, wherein the plurality of network access nodes 910 are selected based on each network access node of the plurality of network access nodes 910 having a channel difference from other channels of the plurality of available network access nodes having a channel difference from other channels of the plurality of available network access nodes 900 greater than a noise variance level among the plurality of available network access nodes 900; in 1520, allocating a digital bit pattern to each network access node of the plurality of network access nodes 910, wherein each network access node has a distinguishing channel due to the selection based on the channel difference; in 1530, modifying a transmission to the terminal device based on the digital bit pattern; in 1540, transmitting the transmission to the terminal device 101; in 1550, receiving the transmission at the terminal device 101; in 1560, identifying the distinguishing channel from the transmission; in 1570, processing the transmission based on the digital bit pattern allocated to the distinguishing channel of the network access node.

Method 1500 may be implemented by a non-transitory computer readable medium having computer executable instructions that cause one or more processing circuits to perform method 1500. The processing circuits may be disparately located, e.g., in radio access network 100 and terminal device 101. Likewise, method 1500 may be performed by any means, e.g., any structure, consistent, mutatis mutandis, with the disclosure.

The channel difference may be a Euclidean distance greater than the noise variance. The Euclidean distance may be defined by $\|g_x[k]-g_y[k]\|^2$ $x,y \in \{1, \ldots, N\}$. The plurality of network access nodes 910 may be part of a small cell network and may operate in a spectrum above 6 GHz in a mmWave band.

In addition, method 1500 may adjust a modulation order of the transmission based on the digital bit pattern, such as the modulation order being adjusted from an effective modulation order to a transmission modulation order based on the digital bit pattern. For example, depending on a number of characters forming the digital bit pattern, e.g., part 703, the modulation order is adjusted from an effective modulation order, e.g., QAM-256 for 8 bits as in bit vector 810, to a transmission modulation order, e.g., QAM-64 for 6 bits as in bit vector 811, based on the digital bit pattern, e.g., if the digital bit pattern contains two bits. Therefore, the effective modulation order may be greater than the transmission modulation order. In an aspect of the disclosure, a maximum possible modulation order may be initially determined based on signal measurements. This modulation order may vary in differing signal environments based on differing signal measurements. Accordingly, radio access network 100 and terminal device 101 may be communicating at one modulation order at one time period, during which the signal environment may change so that conventionally, the modulation order must be reduced. However, as discussed above, the effective modulation order may be maintained in such circumstances while the transmission modulation order is reduced to the new maximum possible modulation order under the new signal conditions in the new time period. Alternatively, the effective modulation order may be greater than the maximum possible modulation order (over the air interface), as the transmission modulation order may be the same as the maximum possible modulation order, however, the effective modulation order may be greater than the transmission modulation order in accordance with method 1500.

Accordingly, radio access network 100 may communicate the digital bit pattern allocated to each distinguishing characteristic to the terminal device 101. Radio access network 100 may allocate the digital bit patterns to respective network access nodes of the plurality of network access nodes 910, which may each have a distinguishing channel. Thus, terminal device 101 may be able to associate a particular distinguishing channel with a particular digital bit pattern for processing.

For transmitting the transmission to terminal device 101, radio access network 100 may select a network access node of the plurality of network access nodes 910 for the transmission based on the digital bit pattern. The digital bit pattern may be composed of a predefined number of characters, or bits. Each network access node of the plurality of network access nodes 910 associated with a distinguishing channel may be allocated digital bit pattern. The network access nodes of the plurality of network access nodes 910 may each be allocated a unique digital bit pattern. For example, if the digital bit pattern "10" was removed from the transmission, the network access node having a distinguishing channel allocated the digital bit pattern "10" would be selected to transmit the transmission to terminal device 101. Therefore, the transmission is modified from an effective transmission by removing the digital bit pattern associated with the distinguishing channel from a predetermined position of the effective transmission. The transmission may then be a truncated version of the effective transmission.

Terminal device 101 may then identify the distinguishing channel from the transmission by comparing each distinguishing channel of the plurality of network access nodes 910 to the transmission until the distinguishing channel is matched to the transmission, e.g., a particular transmission frequency or propagation channel. Upon identification, terminal device 101 may then add the digital bit pattern to the transmission in the predetermined position to recreate the effective transmission.

In method 1500, a training sequence may be transmitted from each network access node of the plurality of network access nodes 910 to the terminal device 101 to identify the distinguishing channel. The distinguishing channel may be at least one of a signal metric; a transmission frequency; and a channel metric. The signal metric may be based on at least one of a signal power and/or a signal quality. The signal quality may be based on at least one of a noise level and/or an interference level. The channel metric may be based on at least one of a channel estimation and a channel correlation.

In an aspect of method 1500, the plurality of network access nodes 910 may be updated based on a measured parameter changing. The measured parameter may be at least one of a location metric, for example a signal power, such as RSRP; a signal quality, which may be based on interference and noise measurements, such as a SINR and/or RSRQ; a synchronization error, and a channel correlation.

In an aspect of the disclosure, Example 1 may include a method for controlling communication between a network and a terminal device, the method including: selecting a plurality of network access nodes based on each network access node having a distinguishing transmission feature; allocating a digital bit pattern to each distinguishing transmission feature; modifying a transmission to the terminal device based on the digital bit pattern; transmitting the transmission to the terminal device; receiving the transmission at the terminal device; identifying the distinguishing transmission feature from the transmission; and processing the transmission based on the digital bit pattern allocated to the distinguishing transmission feature.

Example 2 may include the method according to Example 1, wherein the plurality of network access nodes are selected from a plurality of available network access nodes that are detectable by the terminal device.

Example 3 may include the method according to Example 2, further including: optimizing selecting the plurality of network access nodes based on each network access node of the plurality of network access nodes having a channel difference from other channels of the plurality of available network access nodes greater than a noise variance level among the plurality of available network access nodes.

Example 4 may include the method according to Example 3, wherein the channel difference is a Euclidean distance greater than the noise variance.

Example 5 may include the method according to Example 4, wherein the Euclidean distance is defined by $\|g_x[k]-g_y[k]\|^2$, $x,y \in \{1, \ldots, N\}$.

Example 6 may include the method according to any one of Examples 1-5, further including: adjusting a modulation order of the transmission based on the digital bit pattern.

Example 7 may include the method according to Example 6, wherein the modulation order is adjusted from an effective modulation order to a transmission modulation order based on the digital bit pattern.

Example 8 may include the method according to Example 7, wherein the effective modulation order is greater than the transmission modulation order.

Example 9 may include the method according to Example 7, wherein the effective modulation order is maintained and the transmission modulation order is reduced.

Example 10 may include the method according to any one of Examples 1-9, further including: communicating the digital bit pattern allocated to each distinguishing characteristic to the terminal device.

Example 11 may include the method according to any one of Examples 1-10, further including: selecting a network access node of the plurality of network access nodes to transmit the transmission to the terminal device based on the digital bit pattern.

Example 12 may include the method according to any one of Examples 1-11, further including: updating the plurality of network access nodes based on each network access node having a distinguishing transmission feature.

Example 13 may include the method according to any one of Examples 1-12, further including: updating the plurality of network access nodes based on a measured parameter changing.

Example 14 may include the method according to Example 13, wherein the measured parameter is at least one of: a location metric, a signal quality, a synchronization error, and a channel correlation.

Example 15 may include the method according to Example 14, wherein the location metric is a signal power.

Example 16 may include the method according to Example 15, wherein the signal power is a reference signal receiving power (RSRP).

Example 17 may include the method according to Example 15, wherein the signal quality is based on interference and noise measurements.

Example 18 may include the method according to Example 15, wherein the signal quality is at least one of: a signal to interference plus noise ratio (SINK) and/or a reference signal receiving quality (RSRQ).

Example 19 may include the method according to any one of Examples 1-18, wherein the digital bit pattern is included of a predefined number of characters.

Example 20 may include the method according to any one of Examples 1-19, wherein the digital bit pattern is allocated to a network access node of the plurality of network access nodes associated with the distinguishing transmission feature.

Example 21 may include the method according to any one of Examples 1-20, wherein each network access node of the plurality of network access nodes is allocated a unique digital bit pattern.

Example 22 may include the method according to any one of Examples 1-21, wherein the transmission is modified from an effective transmission by removing the digital bit pattern associated with the distinguishing transmission feature from a predetermined position of the effective transmission.

Example 23 may include the method according to Example 22, wherein the transmission is a truncated version of the effective transmission.

Example 24 may include the method according to Example 22, wherein the transmission is transmitted by the network access node of the plurality of network access nodes associated with the distinguishing transmission feature and allocated the digital bit pattern removed from the predetermined position of the effective transmission.

Example 25 may include the method according to any one of Examples 1-24, wherein identifying the distinguishing transmission feature from the transmission includes comparing each distinguishing transmission feature of the plurality of network access nodes to the transmission.

Example 26 may include the method according to any one of Examples 1-25, wherein the digital bit pattern is added to the transmission in the predetermined position to recreate the effective transmission.

Example 27 may include the method according to any one of Examples 1-26, wherein the plurality of network access nodes are part of a small cell network.

Example 28 may include the method according to any one of Examples 1-27, wherein the plurality of network access nodes operate in a spectrum above 6 GHz.

Example 29 may include the method according to any one of Examples 1-28, wherein the plurality of network access nodes operate in a millimeter wave band.

Example 30 may include the method according to any one of Examples 1-29, further including: transmitting a training sequence from each network access node of the plurality of network access nodes to the terminal device to identify the distinguishing transmission feature.

Example 31 may include the method according to Example 30, wherein the terminal device determines the distinguishing transmission feature from the training sequence.

Example 32 may include the method according to any one of Examples 1-28, wherein the distinguishing characteristic of the channel is at least one of: a signal metric, a transmission frequency, and a channel metric.

Example 33 may include the method according to Example 32, wherein the signal metric is based on at least one of: a signal power and a signal quality.

Example 34 may include the method according to Example 33, wherein the signal quality is based on at least one of a noise level and/or an interference level.

Example 35 may include the method according to Example 32, wherein the channel metric is based on at least one of a channel estimation and/or a channel correlation.

In an aspect of the disclosure, Example 36 may include a method for transmitting to a terminal device, the method including: selecting a plurality of network access nodes based on each network access node having a distinguishing transmission feature; allocating a digital bit pattern to each distinguishing transmission feature; modifying a transmission to the terminal device based on the digital bit pattern; and transmitting the transmission to the terminal device.

Example 37 may include the method according to Example 36, wherein the plurality of network access nodes are selected from a plurality of available network access nodes that are detectable by the terminal device.

Example 38 may include the method according to Example 37, further including: optimizing selecting the plurality of network access nodes based on each network access node of the plurality of network access nodes having a channel difference from other channels of the plurality of available network access nodes greater than a noise variance level among the plurality of available network access nodes.

Example 39 may include the method according to Example 38, wherein the channel difference is a Euclidean distance greater than the noise variance.

Example 40 may include the method according to Example 39, wherein the Euclidean distance is defined by $\|g_x[k]-g_y[k]\|^2$, $x,y \in \{1, \ldots, N\}$.

Example 41 may include the method according to any one of Examples 36-40, further including: adjusting a modulation order of the transmission based on the digital bit pattern.

Example 42 may include the method according to Example 41, wherein the modulation order is adjusted from an effective modulation order to a transmission modulation order based on the digital bit pattern.

Example 43 may include the method according to Example 42, wherein the effective modulation order is greater than the transmission modulation order.

Example 44 may include the method according to Example 42, wherein the effective modulation order is maintained and the transmission modulation order is reduced.

Example 45 may include the method according to any one of Examples 36-44, further including: communicating the digital bit pattern allocated to each distinguishing characteristic to the terminal device.

Example 46 may include the method according to any one of Examples 36-45, further including: selecting a network access node of the plurality of network access nodes to transmit the transmission to the terminal device based on the digital bit pattern.

Example 47 may include the method according to any one of Examples 36-46, further including: updating the plurality of network access nodes based on each network access node having a distinguishing transmission feature.

Example 48 may include the method according to any one of Examples 36-47, further including: updating the plurality of network access nodes based on a measured parameter changing.

Example 49 may include the method according to Example 48, wherein the measured parameter is at least one of: a location metric, a signal quality, a synchronization error, and a channel correlation.

Example 50 may include the method according to Example 49, wherein the location metric is a signal power.

Example 51 may include the method according to Example 50, wherein the signal power is a reference signal receiving power (RSRP).

Example 52 may include the method according to Example 50, wherein the signal quality is based on interference and noise measurements.

Example 53 may include the method according to Example 50, wherein the signal quality is at least one of: a signal to interference plus noise ratio (SINK) and/or a reference signal receiving quality (RSRQ).

Example 54 may include the method according to any one of Examples 36-53, wherein the digital bit pattern is included of a predefined number of characters.

Example 55 may include the method according to any one of Examples 36-54, wherein the digital bit pattern is allocated to a network access node of the plurality of network access nodes associated with the distinguishing transmission feature.

Example 56 may include the method according to any one of Examples 36-55, wherein each network access node of the plurality of network access nodes is allocated a unique digital bit pattern.

Example 57 may include the method according to any one of Examples 36-56 wherein the transmission is modified from an effective transmission by removing the digital bit pattern associated with the distinguishing transmission feature from a predetermined position of the effective transmission.

Example 58 may include the method according to Example 57, wherein the transmission is a truncated version of the effective transmission.

Example 59 may include the method according to Example 57, wherein the transmission is transmitted by the network access node of the plurality of network access nodes associated with the distinguishing transmission feature and allocated the digital bit pattern removed from the predetermined position of the effective transmission.

Example 60 may include the method according to any one of Examples 36-59, wherein the plurality of network access nodes are part of a small cell network.

Example 61 may include the method according to any one of Examples 36-60, wherein the plurality of network access nodes operate in a spectrum above 6 GHz.

Example 62 may include the method according to any one of Examples 36-61, wherein the plurality of network access nodes operate in a millimeter wave band.

Example 63 may include the method according to any one of Examples 36-62, further including: transmitting a training sequence from each network access node of the plurality of network access nodes to the terminal device to determine the distinguishing transmission feature.

In an aspect of the disclosure, Example 64 may include a method of receiving a transmission from a network, the method including: selecting a plurality of network access nodes based on each network access node having a distinguishing transmission feature; receiving a digital bit pattern allocated to each distinguishing transmission feature; receiving the transmission at the terminal device; identifying the distinguishing transmission feature from the transmission; and processing the transmission based on the digital bit pattern allocated to the distinguishing transmission feature.

Example 65 may include the method according to Example 64, wherein the plurality of network access nodes are selected from a plurality of available network access nodes that are detectable by the terminal device.

Example 66 may include the method according to Example 65, further including: optimizing selecting the plurality of network access nodes based on each network access node of the plurality of network access nodes having a channel difference from other channels of the plurality of available network access nodes greater than a noise variance level among the plurality of available network access nodes.

Example 67 may include the method according to Example 66, wherein the channel difference is a Euclidean distance greater than the noise variance.

Example 68 may include the method according to Example 67, wherein the Euclidean distance is defined by $\|g_x[k]-g_y[k]\|^2$, $x,y \in \{1, \ldots, N\}$.

Example 69 may include the method according to any one of Examples 64-68, further including: receiving designation of a modulation order of the transmission based on the digital bit pattern.

Example 70 may include the method according to Example 69, wherein the modulation order is adjusted from an effective modulation order to a transmission modulation order based on the digital bit pattern.

Example 71 may include the method according to Example 70, wherein the effective modulation order is greater than the transmission modulation order.

Example 72 may include the method according to Example 70, wherein the effective modulation order is maintained and the transmission modulation order is reduced.

Example 73 may include the method according to any one of Examples 69-72, further including: processing the transmission further based on the modulation order.

Example 74 may include the method according to any one of Examples 64-73, further including: updating the plurality of network access nodes based on each network access node having a distinguishing transmission feature.

Example 75 may include the method according to any one of Examples 64-74, further including: updating the plurality of network access nodes based on a measured parameter changing.

Example 76 may include the method according to Example 75, wherein the measured parameter is at least one of: a location metric, a signal quality, a synchronization error, and a channel correlation.

Example 77 may include the method according to Example 76, wherein the location metric is a signal power.

Example 78 may include the method according to Example 77, wherein the signal power is a reference signal receiving power (RSRP).

Example 79 may include the method according to Example 77, wherein the signal quality is based on interference and noise measurements.

Example 80 may include the method according to Example 77, wherein the signal quality is at least one of: a signal to interference plus noise ratio (SINK) and/or a reference signal receiving quality (RSRQ).

Example 81 may include the method according to any one of Examples 64-80, wherein the digital bit pattern is included of a predefined number of characters.

Example 82 may include the method according to any one of Examples 64-81, wherein the digital bit pattern is allocated to a network access node of the plurality of network access nodes associated with the distinguishing transmission feature.

Example 83 may include the method according to any one of Examples 64-82, wherein each network access node of the plurality of network access nodes is allocated a unique digital bit pattern.

Example 84 may include the method according to any one of Examples 64-83, wherein the transmission is modified from an effective transmission by removing the digital bit pattern associated with the distinguishing transmission feature from a predetermined position of the effective transmission.

Example 85 may include the method according to Example 84, wherein the transmission is a truncated version of the effective transmission.

Example 86 may include the method according to any one of Examples 64-85, wherein identifying the distinguishing transmission feature from the transmission includes comparing each distinguishing transmission feature of the plurality of network access nodes to the transmission.

Example 87 may include the method according to any one of Examples 64-86, wherein the digital bit pattern is added to the transmission in the predetermined position to recreate the effective transmission.

Example 88 may include the method according to any one of Examples 64-87, wherein the plurality of network access nodes are part of a small cell network.

Example 89 may include the method according to any one of Examples 64-88, wherein the plurality of network access nodes operate in a spectrum above 6 GHz.

Example 90 may include the method according to any one of Examples 64-89, wherein the plurality of network access nodes operate in a millimeter wave band.

Example 91 may include the method according to any one of Examples 64-90, further including: receiving a training sequence from each network access node of the plurality of network access nodes to the terminal device to identify the distinguishing transmission feature.

Example 92 may include the method according to Example 91, further including: determining the distinguishing transmission feature from the training sequence.

Example 93 may include the method according to any one of Examples 64-89, wherein the distinguishing characteristic of the channel is at least one of: a signal metric, a transmission frequency, and a channel metric.

Example 94 may include the method according to Example 93, wherein the signal metric is based on at least one of: a signal power and a signal quality.

Example 95 may include the method according to Example 94, wherein the signal quality is based on at least one of a noise level and/or an interference level.

Example 96 may include the method according to Example 93, wherein the channel metric is based on at least one of a channel estimation and/or a channel correlation.

In an aspect of the disclosure, Example 97 may include a method for controlling communication between a network and a terminal device, the method including: selecting a plurality of network access nodes from a plurality of available network access nodes that are detectable by the terminal device, wherein the plurality of network access nodes are selected based on each network access node of the plurality of network access nodes having a channel difference from other channels of the plurality of available network access nodes greater than a noise variance level among the plurality of available network access nodes; allocating a digital bit pattern to each network access node of the plurality of network access nodes, wherein each network access node has a distinguishing channel due to the selection based on the channel difference; modifying a transmission to the terminal device based on the digital bit pattern; transmitting the transmission to the terminal device; receiving the transmission at the terminal device; identifying the distinguishing channel from the transmission; and processing the transmission based on the digital bit pattern allocated to the distinguishing channel of the network access node.

Example 98 may include the method according to Example 97, wherein the channel difference is a Euclidean distance greater than the noise variance.

Example 99 may include the method according to Example 98, wherein the Euclidean distance is defined by $\|g_x[k]-g_y[k]\|^2$, $x,y \in \{1, \ldots, N\}$.

Example 100 may include the method according to any one of Examples 97-99, further including: adjusting a modulation order of the transmission based on the digital bit pattern.

Example 101 may include the method according to Example 100, wherein the modulation order is adjusted from an effective modulation order to a transmission modulation order based on the digital bit pattern.

Example 102 may include the method according to Example 101, wherein the effective modulation order is greater than the transmission modulation order.

Example 103 may include the method according to Example 101, wherein the effective modulation order is maintained and the transmission modulation order is reduced.

Example 104 may include the method according to any one of Examples 97-103, further including: communicating the digital bit pattern allocated to each distinguishing channel to the terminal device.

Example 105 may include the method according to any one of Examples 97-104, further including: selecting a network access node of the plurality of network access nodes to transmit the transmission to the terminal device based on the digital bit pattern.

Example 106 may include the method according to any one of Examples 97-105, further including: updating the plurality of network access nodes based on each network access node having a distinguishing channel.

Example 107 may include the method according to any one of Examples 97-106, further including: updating the plurality of network access nodes based on a measured parameter changing.

Example 108 may include the method according to Example 107, wherein the measured parameter is at least one of: a location metric, a signal quality, a synchronization error, and a channel correlation.

Example 109 may include the method according to Example 108, wherein the location metric is a signal power.

Example 110 may include the method according to Example 110, wherein the signal power is a reference signal receiving power (RSRP).

Example 111 may include the method according to Example 110, wherein the signal quality is based on interference and noise measurements.

Example 112 may include the method according to Example 110, wherein the signal quality is at least one of: a signal to interference plus noise ratio (SINK) and/or a reference signal receiving quality (RSRQ).

Example 113 may include the method according to any one of Examples 97-112, wherein the digital bit pattern is included of a predefined number of characters.

Example 114 may include the method according to any one of Examples 97-113, wherein the digital bit pattern is allocated to a network access node of the plurality of network access nodes associated with the distinguishing transmission feature.

Example 115 may include the method according to any one of Examples 97-114, wherein each network access node of the plurality of network access nodes is allocated a unique digital bit pattern.

Example 116 may include the method according to any one of Examples 97-115, wherein the transmission is modified from an effective transmission by removing the digital bit pattern associated with the distinguishing transmission feature from a predetermined position of the effective transmission.

Example 117 may include the method according to Example 116, wherein the transmission is a truncated version of the effective transmission.

Example 118 may include the method according to Example 116, wherein the transmission is transmitted by the network access node of the plurality of network access nodes associated with the distinguishing channel and allocated the digital bit pattern removed from the predetermined position of the effective transmission.

Example 119 may include the method according to any one of Examples 97-118, wherein identifying the distinguishing channel from the transmission includes comparing each distinguishing channel of the plurality of network access nodes to the transmission.

Example 120 may include the method according to any one of Examples 97-119, wherein the digital bit pattern is added to the transmission in the predetermined position to recreate the effective transmission.

Example 121 may include the method according to any one of Examples 97-120, wherein the plurality of network access nodes are part of a small cell network.

Example 122 may include the method according to any one of Examples 97-121, wherein the plurality of network access nodes operate in a spectrum above 6 GHz.

Example 123 may include the method according to any one of Examples 97-122, wherein the plurality of network access nodes operate in a millimeter wave band.

Example 124 may include the method according to any one of Examples 97-123, further including: transmitting a training sequence from each network access node of the plurality of network access nodes to the terminal device to identify the distinguishing channel.

Example 125 may include the method according to Example 124, wherein the terminal device determines the distinguishing channel from the training sequence.

Example 126 may include the method according to any one of Examples 97-122, wherein the distinguishing channel is a channel estimation for each network access node.

In an aspect of the disclosure, Example 127 may include a non-transitory computer readable medium having computer executable instructions that cause one or more processing circuits to perform a method for controlling communication between a network and a terminal device, the method including: selecting a plurality of network access nodes (transmission source) based on each network access node having a distinguishing transmission feature; allocating a digital bit pattern to each distinguishing transmission feature; modifying a transmission to the terminal device based on the digital bit pattern; transmitting the transmission to the terminal device; receiving the transmission at the terminal device; identifying the distinguishing transmission feature from the transmission; and processing the transmission based on the digital bit pattern allocated to the distinguishing transmission feature.

Example 128 may include the method according to Example 127, wherein the plurality of network access nodes are selected from a plurality of available network access nodes that are detectable by the terminal device.

Example 129 may include the method according to Example 128, further including: optimizing selecting the plurality of network access nodes based on each network access node of the plurality of network access nodes having a channel difference from other channels of the plurality of available network access nodes greater than a noise variance level among the plurality of available network access nodes.

Example 130 may include the method according to Example 129, wherein the channel difference is a Euclidean distance greater than the noise variance.

Example 131 may include the method according to Example 130, wherein the Euclidean distance is defined by $\|g_x[k]-g_y[k]\|^2$, $x,y \in \{1, \ldots, N\}$.

Example 132 may include the method according to any one of Examples 127-131, further including: adjusting a modulation order of the transmission based on the digital bit pattern.

Example 133 may include the method according to Example 132, wherein the modulation order is adjusted from an effective modulation order to a transmission modulation order based on the digital bit pattern.

Example 134 may include the method according to Example 133, wherein the effective modulation order is greater than the transmission modulation order.

Example 135 may include the method according to Example 133, wherein the effective modulation order is maintained and the transmission modulation order is reduced.

Example 136 may include the method according to any one of Examples 127-135, further including: communicating the digital bit pattern allocated to each distinguishing characteristic to the terminal device.

Example 137 may include the method according to any one of Examples 127-136, further including: selecting a network access node of the plurality of network access nodes to transmit the transmission to the terminal device based on the digital bit pattern.

Example 138 may include the method according to any one of Examples 127-137, further including: updating the plurality of network access nodes based on each network access node having a distinguishing transmission feature.

Example 139 may include the method according to any one of Examples 127-138, further including: updating the plurality of network access nodes based on a measured parameter changing.

Example 140 may include the method according to Example 139, wherein the measured parameter is at least one of: a location metric, a signal quality, a synchronization error, and a channel correlation.

Example 141 may include the method according to Example 140, wherein the location metric is a signal power.

Example 142 may include the method according to Example 141, wherein the signal power is a reference signal receiving power (RSRP).

Example 143 may include the method according to Example 141, wherein the signal quality is based on interference and noise measurements.

Example 144 may include the method according to Example 141, wherein the signal quality is at least one of: a signal to interference plus noise ratio (SINK) and/or a reference signal receiving quality (RSRQ).

Example 145 may include the method according to any one of Examples 127-144, wherein the digital bit pattern is included of a predefined number of characters.

Example 146 may include the method according to any one of Examples 127-145, wherein the digital bit pattern is allocated to a network access node of the plurality of network access nodes associated with the distinguishing transmission feature.

Example 147 may include the method according to any one of Examples 127-146, wherein each network access node of the plurality of network access nodes is allocated a unique digital bit pattern.

Example 148 may include the method according to any one of Examples 127-147, wherein the transmission is modified from an effective transmission by removing the digital bit pattern associated with the distinguishing transmission feature from a predetermined position of the effective transmission.

Example 149 may include the method according to Example 148, wherein the transmission is a truncated version of the effective transmission.

Example 150 may include the method according to Example 148, wherein the transmission is transmitted by the network access node of the plurality of network access nodes associated with the distinguishing transmission feature and allocated the digital bit pattern removed from the predetermined position of the effective transmission.

Example 151 may include the method according to any one of Examples 127-150, wherein identifying the distinguishing transmission feature from the transmission includes comparing each distinguishing transmission feature of the plurality of network access nodes to the transmission.

Example 152 may include the method according to any one of Examples 127-151, wherein the digital bit pattern is added to the transmission in the predetermined position to recreate the effective transmission.

Example 153 may include the method according to any one of Examples 127-152, wherein the plurality of network access nodes are part of a small cell network.

Example 154 may include the method according to any one of Examples 127-153, wherein the plurality of network access nodes operate in a spectrum above 6 GHz.

Example 155 may include the method according to any one of Examples 127-154, wherein the plurality of network access nodes operate in a millimeter wave band.

Example 156 may include the method according to any one of Examples 127-155, further including: transmitting a training sequence from each network access node of the plurality of network access nodes to the terminal device to identify the distinguishing transmission feature.

Example 157 may include the method according to Example 156, wherein the terminal device determines the distinguishing transmission feature from the training sequence.

Example 158 may include the method according to any one of Examples 127-154, wherein the distinguishing characteristic of the channel is at least one of: a signal metric, a transmission frequency, and a channel metric.

Example 159 may include the method according to Example 158, wherein the signal metric is based on at least one of: a signal power and a signal quality.

Example 160 may include the method according to Example 159, wherein the signal quality is based on at least one of a noise level and/or an interference level.

Example 161 may include the method according to Example 158, wherein the channel metric is based on at least one of a channel estimation and/or a channel correlation.

In an aspect of the disclosure, Example 162 may include a non-transitory computer readable medium having computer executable instructions that cause a processing circuit to perform a method for transmitting to a terminal device, the method including: selecting a plurality of network access nodes based on each network access node having a distinguishing transmission feature; allocating a digital bit pattern to each distinguishing transmission feature; modifying a transmission to the terminal device based on the digital bit pattern; and transmitting the transmission to the terminal device.

Example 163 may include the method according to Example 162, wherein the plurality of network access nodes are selected from a plurality of available network access nodes that are detectable by the terminal device.

Example 164 may include the method according to Example 163, further including: optimizing selecting the plurality of network access nodes based on each network access node of the plurality of network access nodes having a channel difference from other channels of the plurality of available network access nodes greater than a noise variance level among the plurality of available network access nodes.

Example 165 may include the method according to Example 164, wherein the channel difference is a Euclidean distance greater than the noise variance.

Example 166 may include the method according to Example 165, wherein the Euclidean distance is defined by $\|g_x[k]-g_y[k]\|^2$, $x,y \in \{1, \ldots, N\}$.

Example 167 may include the method according to any one of Examples 162-166, further including: adjusting a modulation order of the transmission based on the digital bit pattern.

Example 168 may include the method according to Example 167, wherein the modulation order is adjusted from an effective modulation order to a transmission modulation order based on the digital bit pattern.

Example 169 may include the method according to Example 168, wherein the effective modulation order is greater than the transmission modulation order.

Example 170 may include the method according to Example 168, wherein the effective modulation order is maintained and the transmission modulation order is reduced.

Example 171 may include the method according to any one of Examples 162-170, further including: communicating the digital bit pattern allocated to each distinguishing characteristic to the terminal device.

Example 172 may include the method according to any one of Examples 162-171 further including: selecting a network access node of the plurality of network access nodes to transmit the transmission to the terminal device based on the digital bit pattern.

Example 173 may include the method according to any one of Examples 162-172, further including: updating the plurality of network access nodes based on each network access node having a distinguishing transmission feature.

Example 174 may include the method according to any one of Examples 162-173, further including: updating the plurality of network access nodes based on a measured parameter changing.

Example 175 may include the method according to Example 174, wherein the measured parameter is at least one of: a location metric, a signal quality, a synchronization error, and a channel correlation.

Example 176 may include the method according to Example 175, wherein the location metric is a signal power.

Example 177 may include the method according to Example 176, wherein the signal power is a reference signal receiving power (RSRP).

Example 178 may include the method according to Example 176, wherein the signal quality is based on interference and noise measurements.

Example 179 may include the method according to Example 176, wherein the signal quality is at least one of: a signal to interference plus noise ratio (SINK) and/or a reference signal receiving quality (RSRQ).

Example 180 may include the method according to any one of Examples 162-179, wherein the digital bit pattern is included of a predefined number of characters.

Example 181 may include the method according to any one of Examples 162-180, wherein the digital bit pattern is allocated to a network access node of the plurality of network access nodes associated with the distinguishing transmission feature.

Example 182 may include the method according to any one of Examples 162-181, wherein each network access node of the plurality of network access nodes is allocated a unique digital bit pattern.

Example 183 may include the method according to any one of Examples 162-182 wherein the transmission is modified from an effective transmission by removing the digital bit pattern associated with the distinguishing transmission feature from a predetermined position of the effective transmission.

Example 184 may include the method according to Example 183, wherein the transmission is a truncated version of the effective transmission.

Example 185 may include the method according to Example 183, wherein the transmission is transmitted by the network access node of the plurality of network access nodes associated with the distinguishing transmission feature and allocated the digital bit pattern removed from the predetermined position of the effective transmission.

Example 186 may include the method according to any one of Examples 162-185, wherein the plurality of network access nodes are part of a small cell network.

Example 187 may include the method according to any one of Examples 162-186, wherein the plurality of network access nodes operate in a spectrum above 6 GHz.

Example 188 may include the method according to any one of Examples 162-187, wherein the plurality of network access nodes operate in a millimeter wave band.

Example 189 may include the method according to any one of Examples 162-188, further including: transmitting a training sequence from each network access node of the plurality of network access nodes to the terminal device to determine the distinguishing transmission feature.

In an aspect of the disclosure, Example 190 may include a non-transitory computer readable medium having computer executable instructions that cause a processing circuit to perform a method of receiving a transmission from a network, the method including: selecting a plurality of network access nodes based on each network access node having a distinguishing transmission feature; receiving a digital bit pattern allocated to each distinguishing transmission feature; receiving the transmission at the terminal device; identifying the distinguishing transmission feature from the transmission; and processing the transmission based on the digital bit pattern allocated to the distinguishing transmission feature.

Example 191 may include the method according to Example 190, wherein the plurality of network access nodes are selected from a plurality of available network access nodes that are detectable by the terminal device.

Example 192 may include the method according to Example 191, further including: optimizing selecting the plurality of network access nodes based on each network access node of the plurality of network access nodes having a channel difference from other channels of the plurality of available network access nodes greater than a noise variance level among the plurality of available network access nodes.

Example 193 may include the method according to Example 192, wherein the channel difference is a Euclidean distance greater than the noise variance.

Example 194 may include the method according to Example 193, wherein the Euclidean distance is defined by $\|g_x[k]-g_y[k]\|^2$, $x,y \in \{1, \ldots, N\}$.

Example 195 may include the method according to any one of Examples 190-194, further including: receiving designation of a modulation order of the transmission based on the digital bit pattern.

Example 196 may include the method according to Example 195, wherein the modulation order is adjusted from an effective modulation order to a transmission modulation order based on the digital bit pattern.

Example 197 may include the method according to Example 196, wherein the effective modulation order is greater than the transmission modulation order.

Example 198 may include the method according to Example 196, wherein the effective modulation order is maintained and the transmission modulation order is reduced.

Example 199 may include the method according to any one of Examples 195-198, further including: processing the transmission further based on the modulation order.

Example 200 may include the method according to any one of Examples 190-199, further including: updating the plurality of network access nodes based on each network access node having a distinguishing transmission feature.

Example 201 may include the method according to any one of Examples 190-200, further including: updating the plurality of network access nodes based on a measured parameter changing.

Example 202 may include the method according to Example 201, wherein the measured parameter is at least one of: a location metric, a signal quality, a synchronization error, and a channel correlation.

Example 203 may include the method according to Example 202, wherein the location metric is a signal power.

Example 204 may include the method according to Example 203, wherein the signal power is a reference signal receiving power (RSRP).

Example 205 may include the method according to Example 203, wherein the signal quality is based on interference and noise measurements.

Example 206 may include the method according to Example 203, wherein the signal quality is at least one of: a signal to interference plus noise ratio (SINK) and/or a reference signal receiving quality (RSRQ).

Example 207 may include the method according to any one of Examples 190-206, wherein the digital bit pattern is included of a predefined number of characters.

Example 208 may include the method according to any one of Examples 190-207, wherein the digital bit pattern is allocated to a network access node of the plurality of network access nodes associated with the distinguishing transmission feature.

Example 209 may include the method according to any one of Examples 190-208, wherein each network access node of the plurality of network access nodes is allocated a unique digital bit pattern.

Example 210 may include the method according to any one of Examples 190-209, wherein the transmission is modified from an effective transmission by removing the digital bit pattern associated with the distinguishing transmission feature from a predetermined position of the effective transmission.

Example 211 may include the method according to Example 210, wherein the transmission is a truncated version of the effective transmission.

Example 212 may include the method according to any one of Examples 190-211, wherein identifying the distinguishing transmission feature from the transmission includes comparing each distinguishing transmission feature of the plurality of network access nodes to the transmission.

Example 213 may include the method according to any one of Examples 190-212, wherein the digital bit pattern is added to the transmission in the predetermined position to recreate the effective transmission.

Example 214 may include the method according to any one of Examples 190-213, wherein the plurality of network access nodes are part of a small cell network.

Example 215 may include the method according to any one of Examples 190-214, wherein the plurality of network access nodes operate in a spectrum above 6 GHz.

Example 216 may include the method according to any one of Examples 190-215, wherein the plurality of network access nodes operate in a millimeter wave band.

Example 217 may include the method according to any one of Examples 190-216, further including: receiving a training sequence from each network access node of the plurality of network access nodes to the terminal device to identify the distinguishing transmission feature.

Example 218 may include the method according to Example 217, further including: determining the distinguishing transmission feature from the training sequence.

Example 219 may include the method according to any one of Examples 190-245, wherein the distinguishing characteristic of the channel is at least one of: a signal metric, a transmission frequency, and a channel metric.

Example 220 may include the method according to Example 219, wherein the signal metric is based on at least one of: a signal power and a signal quality.

Example 221 may include the method according to Example 223, wherein the signal quality is based on at least one of a noise level and/or an interference level.

Example 222 may include the method according to Example 219, wherein the channel metric is based on at least one of a channel estimation and/or a channel correlation.

In an aspect of the disclosure, Example 223 may include a non-transitory computer readable medium having computer executable instructions that cause one or more processing circuits to perform a method for controlling communication between a network and a terminal device, the method including: selecting a plurality of network access nodes from a plurality of available network access nodes that are detectable by the terminal device, wherein the plurality of network access nodes are selected based on each network access node of the plurality of network access nodes having a channel difference from other channels of the plurality of available network access nodes greater than a noise variance level among the plurality of available network access nodes; allocating a digital bit pattern to each network access node of the plurality of network access nodes, wherein each network access node has a distinguishing channel due to the selection based on the channel difference; modifying a transmission to the terminal device based on the digital bit pattern; transmitting the transmission to the terminal device based on the digital bit pattern; receiving the transmission at the terminal device; identifying the distinguishing channel from the transmission; and processing the transmission based on the digital bit pattern allocated to the distinguishing channel of the network access node.

Example 224 may include the method according to Example 223, wherein the channel difference is a Euclidean distance greater than the noise variance.

Example 225 may include the method according to Example 224, wherein the Euclidean distance is defined by $\|g_x[k]-g_y[k]\|^2$, $x,y \in \{1, \ldots, N\}$.

Example 226 may include the method according to any one of Examples 223-225, further including: adjusting a modulation order of the transmission based on the digital bit pattern.

Example 227 may include the method according to Example 226, wherein the modulation order is adjusted from an effective modulation order to a transmission modulation order based on the digital bit pattern.

Example 228 may include the method according to Example 227, wherein the effective modulation order is greater than the transmission modulation order.

Example 229 may include the method according to Example 227, wherein the effective modulation order is maintained and the transmission modulation order is reduced.

Example 230 may include the method according to any one of Examples 223-229, further including: communicating the digital bit pattern allocated to each distinguishing channel to the terminal device.

Example 231 may include the method according to any one of Examples 223-230, further including: selecting a network access node of the plurality of network access nodes to transmit the transmission to the terminal device based on the digital bit pattern.

Example 232 may include the method according to any one of Examples 223-231, further including: updating the plurality of network access nodes based on each network access node having a distinguishing channel.

Example 233 may include the method according to any one of Examples 223-232, further including: updating the plurality of network access nodes based on a measured parameter changing.

Example 234 may include the method according to Example 233, wherein the measured parameter is at least one of: a location metric, a signal quality, a synchronization error, and a channel correlation.

Example 235 may include the method according to Example 234, wherein the location metric is a signal power.

Example 236 may include the method according to Example 236, wherein the signal power is a reference signal receiving power (RSRP).

Example 237 may include the method according to Example 236, wherein the signal quality is based on interference and noise measurements.

Example 238 may include the method according to Example 236, wherein the signal quality is at least one of: a signal to interference plus noise ratio (SINK) and/or a reference signal receiving quality (RSRQ).

Example 239 may include the method according to any one of Examples 223-238, wherein the digital bit pattern is included of a predefined number of characters.

Example 240 may include the method according to any one of Examples 223-229, wherein the digital bit pattern is allocated to a network access node of the plurality of network access nodes associated with the distinguishing transmission feature.

Example 241 may include the method according to any one of Examples 223-240, wherein each network access node of the plurality of network access nodes is allocated a unique digital bit pattern.

Example 242 may include the method according to any one of Examples 223-241, wherein the transmission is modified from an effective transmission by removing the digital bit pattern associated with the distinguishing transmission feature from a predetermined position of the effective transmission.

Example 243 may include the method according to Example 242, wherein the transmission is a truncated version of the effective transmission.

Example 244 may include the method according to Example 242, wherein the transmission is transmitted by the network access node of the plurality of network access nodes associated with the distinguishing channel and allocated the digital bit pattern removed from the predetermined position of the effective transmission.

Example 245 may include the method according to any one of Examples 223-244, wherein identifying the distinguishing channel from the transmission includes comparing each distinguishing channel of the plurality of network access nodes to the transmission.

Example 246 may include the method according to any one of Examples 223-245, wherein the digital bit pattern is added to the transmission in the predetermined position to recreate the effective transmission.

Example 247 may include the method according to any one of Examples 223-246, wherein the plurality of network access nodes are part of a small cell network.

Example 248 may include the method according to any one of Examples 223-247, wherein the plurality of network access nodes operate in a spectrum above 6 GHz.

Example 249 may include the method according to any one of Examples 223-248, wherein the plurality of network access nodes operate in a millimeter wave band.

Example 250 may include the method according to any one of Examples 223-249, further including: transmitting a training sequence from each network access node of the plurality of network access nodes to the terminal device to identify the distinguishing channel.

Example 251 may include the method according to Example 250, wherein the terminal device determines the distinguishing channel from the training sequence.

Example 252 may include the method according to any one of Examples 223-248, wherein the distinguishing channel is a channel estimation for each network access node.

In an aspect of the disclosure, Example 253 may include a system configured to control communication between a network and a terminal device, the system including: the network including a plurality of network access nodes selected based on each network access node having a distinguishing transmission feature; wherein the network is configured to: allocate a digital bit pattern to each distinguishing transmission feature; modify a transmission to the terminal device based on the digital bit pattern; and transmit the transmission to the terminal device; and wherein the terminal device is configured to: receive the transmission at the terminal device; identify the distinguishing transmission feature from the transmission; and process the transmission based on the digital bit pattern allocated to the distinguishing transmission feature.

Example 254 may include the system according to Example 253, wherein the plurality of network access nodes are selected from a plurality of available network access nodes that are detectable by the terminal device.

Example 255 may include the system according to Example 254, wherein the plurality of network access nodes are further selected based on each network access node of the plurality of network access nodes having a channel difference from other channels of the plurality of available network access nodes greater than a noise variance level among the plurality of available network access nodes.

Example 256 may include the system according to Example 255, wherein the channel difference is a Euclidean distance greater than the noise variance.

Example 257 may include the system according to Example 256, wherein the Euclidean distance is defined by $\|g_x[k]-g_y[k]\|^2$, $x,y \in \{1, \ldots, N\}$.

Example 258 may include the system according to any one of Examples 253-257, wherein the network is further configured to adjust a modulation order of the transmission based on the digital bit pattern.

Example 259 may include the system according to Example 258, wherein the network is further configured to adjust the modulation order from an effective modulation order to a transmission modulation order based on the digital bit pattern.

Example 260 may include the system according to Example 259, wherein the effective modulation order is greater than the transmission modulation order.

Example 261 may include the system according to Example 259, wherein the effective modulation order is maintained and the transmission modulation order is reduced.

Example 262 may include the system according to any one of Examples 253-261, wherein the network is further configured to communicate the digital bit pattern allocated to each distinguishing characteristic to the terminal device.

Example 263 may include the system according to any one of Examples 253-261, wherein the terminal device is further configured to receive the digital bit pattern allocated to each distinguishing characteristic to the terminal device.

Example 264 may include the system according to any one of Examples 253-263, wherein the network is further configured to select a network access node of the plurality of network access nodes to transmit the transmission to the terminal device based on the digital bit pattern.

Example 265 may include the system according to any one of Examples 253-264, wherein the network is further configured to update the plurality of network access nodes based on each network access node having a distinguishing transmission feature.

Example 266 may include the system according to any one of Examples 253-265, wherein the network is further configured to update the plurality of network access nodes based on a measured parameter changing.

Example 267 may include the system according to any one of Examples 253-264, wherein the terminal device is further configured to update the plurality of network access nodes based on each network access node having a distinguishing transmission feature.

Example 268 may include the system according to any one of Examples 253-267, wherein the terminal device is further configured to update the plurality of network access nodes based on a measured parameter changing.

Example 269 may include the system according to any one of Examples 266 and 268, wherein the measured parameter is at least one of: a location metric, a signal quality, a synchronization error, and a channel correlation.

Example 270 may include the system according to Example 269, wherein the location metric is a signal power.

Example 271 may include the system according to Example 270, wherein the signal power is a reference signal receiving power (RSRP).

Example 272 may include the system according to Example 270, wherein the signal quality is based on interference and noise measurements.

Example 273 may include the system according to Example 270, wherein the signal quality is at least one of: a signal to interference plus noise ratio (SINK) and/or a reference signal receiving quality (RSRQ).

Example 274 may include the system according to any one of Examples 253-273, wherein the digital bit pattern is included of a predefined number of characters.

Example 275 may include the system according to any one of Examples 253-274, wherein the digital bit pattern is allocated to a network access node of the plurality of network access nodes associated with the distinguishing transmission feature.

Example 276 may include the system according to any one of Examples 253-275, wherein each network access node of the plurality of network access nodes is allocated a unique digital bit pattern.

Example 277 may include the system according to any one of Examples 253-276, wherein the transmission is modified from an effective transmission by removing the digital bit pattern associated with the distinguishing transmission feature from a predetermined position of the effective transmission.

Example 278 may include the system according to Example 277, wherein the transmission is a truncated version of the effective transmission.

Example 279 may include the system according to Example 277, wherein the transmission is transmitted by the network access node of the plurality of network access nodes associated with the distinguishing transmission feature and allocated the digital bit pattern removed from the predetermined position of the effective transmission.

Example 280 may include the system according to any one of Examples 253-279, wherein identifying the distinguishing transmission feature from the transmission includes comparing each distinguishing transmission feature of the plurality of network access nodes to the transmission.

Example 281 may include the system according to any one of Examples 253-280, wherein the digital bit pattern is added to the transmission in the predetermined position to recreate the effective transmission.

Example 282 may include the system according to any one of Examples 253-281, wherein the plurality of network access nodes are part of a small cell network.

Example 283 may include the system according to any one of Examples 253-282, wherein the plurality of network access nodes operate in a spectrum above 6 GHz.

Example 284 may include the system according to any one of Examples 253-283, wherein the plurality of network access nodes operate in a millimeter wave band.

Example 285 may include the system according to any one of Examples 253-284, wherein the network is further configured to transmit a training sequence from each network access node of the plurality of network access nodes to the terminal device to identify the distinguishing transmission feature.

Example 286 may include the system according to Example 285, wherein the terminal device determines the distinguishing transmission feature from the training sequence.

Example 287 may include the system according to any one of Examples 253-283, wherein the distinguishing characteristic of the channel is at least one of: a signal metric, a transmission frequency, and a channel metric.

Example 288 may include the system according to Example 287, wherein the signal metric is based on at least one of: a signal power and a signal quality.

Example 289 may include the system according to Example 288, wherein the signal quality is based on at least one of a noise level and/or an interference level.

Example 290 may include the system according to Example 287, wherein the channel metric is based on at least one of a channel estimation and/or a channel correlation.

In an aspect of the disclosure, Example 291 may include a network configured to control communication to a terminal device, the network including: a plurality of network access nodes selected based on each network access node having a distinguishing transmission feature; wherein the network is configured to: allocate a digital bit pattern to each distinguishing transmission feature; modify a transmission to the terminal device based on the digital bit pattern; and transmit the transmission to the terminal device.

Example 292 may include the network according to Example 291, wherein the plurality of network access nodes are selected from a plurality of available network access nodes that are detectable by the terminal device.

Example 293 may include the network according to 292, wherein the plurality of network access nodes are further selected based on each network access node of the plurality of network access nodes having a channel difference from other channels of the plurality of available network access nodes greater than a noise variance level among the plurality of available network access nodes.

Example 294 may include the network according to Example 293, wherein the channel difference is a Euclidean distance greater than the noise variance.

Example 295 may include the network according to Example 294, wherein the Euclidean distance is defined by $\|g_x[k]-g_y[k]\|^2$, $x,y \in \{1, \ldots, N\}$.

Example 296 may include the network according to any one of Examples 291-295, wherein the network is further configured to adjust a modulation order of the transmission based on the digital bit pattern.

Example 297 may include the network according to Example 296, wherein the modulation order is adjusted from an effective modulation order to a transmission modulation order based on the digital bit pattern.

Example 298 may include the network according to Example 297, wherein the effective modulation order is greater than the transmission modulation order.

Example 299 may include the network according to Example 297, wherein the effective modulation order is maintained and the transmission modulation order is reduced.

Example 300 may include the network according to any one of Examples 291-299, wherein the network is further configured to communicate the digital bit pattern allocated to each distinguishing characteristic to the terminal device.

Example 301 may include the network according to any one of Examples 291-300, wherein the network is further configured to select a network access node of the plurality of network access nodes to transmit the transmission to the terminal device based on the digital bit pattern.

Example 302 may include the network according to any one of Examples 291-301, wherein the network is further configured to update the plurality of network access nodes based on each network access node having a distinguishing transmission feature.

Example 303 may include the network according to any one of Examples 391-302, wherein the network is further configured to update the plurality of network access nodes based on a measured parameter changing.

Example 304 may include the network according to Example 303, wherein the measured parameter is at least one of: a location metric, a signal quality, a synchronization error, and a channel correlation.

Example 305 may include the network according to Example 304, wherein the location metric is a signal power.

Example 306 may include the network according to Example 305, wherein the signal power is a reference signal receiving power (RSRP).

Example 307 may include the network according to Example 305, wherein the signal quality is based on interference and noise measurements.

Example 308 may include the network according to Example 305, wherein the signal quality is at least one of: a signal to interference plus noise ratio (SINK) and/or a reference signal receiving quality (RSRQ).

Example 309 may include the network according to any one of Examples 291-308, wherein the digital bit pattern is included of a predefined number of characters.

Example 310 may include the network according to any one of Examples 291-309, wherein the digital bit pattern is allocated to a network access node of the plurality of network access nodes associated with the distinguishing transmission feature.

Example 311 may include the network according to any one of Examples 291-310, wherein each network access node of the plurality of network access nodes is allocated a unique digital bit pattern.

Example 312 may include the network according to any one of Examples 291-311, wherein the transmission is modified from an effective transmission by removing the digital bit pattern associated with the distinguishing transmission feature from a predetermined position of the effective transmission.

Example 313 may include the network according to Example 312, wherein the transmission is a truncated version of the effective transmission.

Example 314 may include the network according to Example 312, wherein the transmission is transmitted by the network access node of the plurality of network access nodes associated with the distinguishing transmission feature and allocated the digital bit pattern removed from the predetermined position of the effective transmission.

Example 315 may include the network according to any one of Examples 291-314, wherein identifying the distinguishing transmission feature from the transmission includes comparing each distinguishing transmission feature of the plurality of network access nodes to the transmission.

Example 316 may include the network according to any one of Examples 291-315, wherein the digital bit pattern is added to the transmission in the predetermined position to recreate the effective transmission.

Example 317 may include the network according to any one of Examples 291-316, wherein the plurality of network access nodes are part of a small cell network.

Example 318 may include the network according to any one of Examples 21-317, wherein the plurality of network access nodes operate in a spectrum above 6 GHz.

Example 319 may include the network according to any one of Examples 291-318, wherein the plurality of network access nodes operate in a millimeter wave band.

Example 320 may include the network according to any one of Examples 291-319, wherein the network is further configured to transmit a training sequence from each network access node of the plurality of network access nodes to the terminal device to identify the distinguishing transmission feature.

Example 321 may include the network according to any one of Examples 291-318 wherein the distinguishing characteristic of the channel is at least one of: a signal metric, a transmission frequency, and a channel metric.

Example 322 may include the network according to Example 321, wherein the signal metric is based on at least one of: a signal power and a signal quality.

Example 323 may include the network according to Example 322, wherein the signal quality is based on at least one of a noise level and/or an interference level.

Example 324 may include the network according to Example 321, wherein the channel metric is based on at least one of a channel estimation and/or a channel correlation.

In an aspect of the disclosure, Example 325 may include a terminal device configured to receive a transmission from a network, and further configured to: select a plurality of network access nodes based on each network access node having a distinguishing transmission feature; receive a digital bit pattern allocated to each distinguishing transmission feature; receive the transmission at the terminal device; identify the distinguishing transmission feature from the transmission; and process the transmission based on the digital bit pattern allocated to the distinguishing transmission feature.

Example 326 may include the terminal device according to Example 325, wherein the plurality of network access nodes are selected from a plurality of available network access nodes that are detectable by the terminal device.

Example 327 may include the terminal device according to 326, wherein the plurality of network access nodes are further selected based on each network access node of the plurality of network access nodes having a channel difference from other channels of the plurality of available network access nodes greater than a noise variance level among the plurality of available network access nodes.

Example 328 may include the terminal device according to Example 327, wherein the channel difference is a Euclidean distance greater than the noise variance.

Example 329 may include the terminal device according to Example 328, wherein the Euclidean distance is defined by $\|g_x[k]-g_y[k]\|^2$, $x,y \in \{1, \ldots, N\}$.

Example 330 may include the terminal device according to any one of Examples 325-329, wherein the terminal device is further configured to receive the digital bit pattern allocated to each distinguishing characteristic to the terminal device.

Example 331 may include the terminal device according to any one of Examples 325-330, wherein the terminal device is further configured to receive designation of a modulation order of the transmission based on the digital bit pattern.

Example 332 may include the terminal device according to Example 331, wherein the modulation order is adjusted from an effective modulation order to a transmission modulation order based on the digital bit pattern.

Example 333 may include the terminal device according to Example 332, wherein the effective modulation order is greater than the transmission modulation order.

Example 334 may include the terminal device according to Example 332, wherein the effective modulation order is maintained and the transmission modulation order is reduced.

Example 335 may include the terminal device according to any one of Examples 331-334, wherein the terminal device is further configured to process the transmission further based on the modulation order.

Example 336 may include the terminal device according to any one of Examples 325-335, wherein the terminal device is further configured to update the plurality of network access nodes based on each network access node having a distinguishing transmission feature.

Example 337 may include the terminal device according to any one of Examples 325-336, wherein the terminal device is further configured to update the plurality of network access nodes based on a measured parameter changing.

Example 338 may include the terminal device according to any one of Example 337, wherein the measured parameter is at least one of: a location metric, a signal quality, a synchronization error, and a channel correlation.

Example 339 may include the terminal device according to Example 338, wherein the location metric is a signal power.

Example 340 may include the terminal device according to Example 339, wherein the signal power is a reference signal receiving power (RSRP).

Example 341 may include the terminal device according to Example 339, wherein the signal quality is based on interference and noise measurements.

Example 342 may include the terminal device according to Example 339, wherein the signal quality is at least one of: a signal to interference plus noise ratio (SINK) and/or a reference signal receiving quality (RSRQ).

Example 343 may include the terminal device according to any one of Examples 325-342, wherein the digital bit pattern is included of a predefined number of characters.

Example 344 may include the terminal device according to any one of Examples 325-343, wherein the digital bit pattern is allocated to a network access node of the plurality of network access nodes associated with the distinguishing transmission feature.

Example 345 may include the terminal device according to any one of Examples 325-344, wherein each network access node of the plurality of network access nodes is allocated a unique digital bit pattern.

Example 346 may include the terminal device according to any one of Examples 325-345, wherein the transmission is modified from an effective transmission by removing the digital bit pattern associated with the distinguishing transmission feature from a predetermined position of the effective transmission.

Example 347 may include the terminal device according to Example 346, wherein the transmission is a truncated version of the effective transmission.

Example 348 may include the terminal device according to Example 346, wherein the transmission is transmitted by the network access node of the plurality of network access nodes associated with the distinguishing transmission feature and allocated the digital bit pattern removed from the predetermined position of the effective transmission.

Example 349 may include the terminal device according to any one of Examples 325-348, wherein identifying the distinguishing transmission feature from the transmission includes comparing each distinguishing transmission feature of the plurality of network access nodes to the transmission.

Example 350 may include the terminal device according to any one of Examples 325-349, wherein the digital bit pattern is added to the transmission in the predetermined position to recreate the effective transmission.

Example 351 may include the terminal device according to any one of Examples 325-350, wherein the plurality of network access nodes are part of a small cell network.

Example 352 may include the terminal device according to any one of Examples 325-351, wherein the plurality of network access nodes operate in a spectrum above 6 GHz.

Example 353 may include the terminal device according to any one of Examples 325-352, wherein the plurality of network access nodes operate in a millimeter wave band.

Example 354 may include the terminal device according to any one of Examples 325-353, wherein the terminal device is configured to determine the distinguishing transmission feature from a training sequence transmitted from a network access node of the plurality of network access nodes.

Example 355 may include the terminal device according to any one of Examples 325-352, wherein the distinguishing characteristic of the channel is at least one of: a signal metric, a transmission frequency, and a channel metric.

Example 356 may include the terminal device according to Example 355, wherein the signal metric is based on at least one of: a signal power and a signal quality.

Example 357 may include the terminal device according to Example 356, wherein the signal quality is based on at least one of a noise level and/or an interference level.

Example 358 may include the terminal device according to Example 355, wherein the channel metric is based on at least one of a channel estimation and/or a channel correlation.

In an aspect of the disclosure, Example 359 may include a terminal device configured to receive communications from a network, and further configured to: connect to a plurality of network access nodes based on each network access node having a distinguishing transmission feature; receive a digital bit pattern allocated to each distinguishing transmission feature; receive the transmission at the terminal device; identify the distinguishing transmission feature from the transmission; and process the transmission based on the digital bit pattern allocated to the distinguishing transmission feature.

Example 360 may include the terminal device according to Example 359, wherein the plurality of network access nodes are selected from a plurality of available network access nodes that are detectable by the terminal device.

Example 361 may include the terminal device according to Example 360, wherein the plurality of network access nodes are further selected based on each network access node of the plurality of network access nodes having a channel difference from other channels of the plurality of available network access nodes greater than a noise variance level among the plurality of available network access nodes.

Example 362 may include the terminal device according to Example 361, wherein the channel difference is a Euclidean distance greater than the noise variance.

Example 363 may include the terminal device according to Example 362, wherein the Euclidean distance is defined by $\|g_x[k]-g_y[k]\|^2$, $x,y \in \{1, \ldots, N\}$.

Example 364 may include the terminal device according to any one of Examples 359-363, wherein the terminal device is further configured to receive the digital bit pattern allocated to each distinguishing characteristic to the terminal device.

Example 365 may include the terminal device according to any one of Examples 359-364, wherein the terminal device is further configured to receive designation of a modulation order of the transmission based on the digital bit pattern.

Example 366 may include the terminal device according to Example 365, wherein the modulation order is adjusted from an effective modulation order to a transmission modulation order based on the digital bit pattern.

Example 367 may include the terminal device according to Example 366, wherein the effective modulation order is greater than the transmission modulation order.

Example 368 may include the terminal device according to Example 366, wherein the effective modulation order is maintained and the transmission modulation order is reduced.

Example 369 may include the terminal device according to any one of Examples 365-368, wherein the terminal device is further configured to process the transmission further based on the modulation order.

Example 370 may include the terminal device according to any one of Examples 359-369, wherein the terminal device is further configured to update the plurality of network access nodes based on each network access node having a distinguishing transmission feature.

Example 371 may include the terminal device according to any one of Examples 359-370, wherein the terminal device is further configured to update the plurality of network access nodes based on a measured parameter changing.

Example 372 may include the terminal device according to Example 371, wherein the measured parameter is at least one of: a location metric, a signal quality, a synchronization error, and a channel correlation.

Example 373 may include the terminal device according to Example 372, wherein the location metric is a signal power.

Example 374 may include the terminal device according to Example 373, wherein the signal power is a reference signal receiving power (RSRP).

Example 375 may include the terminal device according to Example 373, wherein the signal quality is based on interference and noise measurements.

Example 376 may include the terminal device according to Example 373, wherein the signal quality is at least one of: a signal to interference plus noise ratio (SINK) and/or a reference signal receiving quality (RSRQ).

Example 377 may include the terminal device according to any one of Examples 359-376, wherein the digital bit pattern is included of a predefined number of characters.

Example 378 may include the terminal device according to any one of Examples 359-377, wherein the digital bit pattern is allocated to a network access node of the plurality of network access nodes associated with the distinguishing transmission feature.

Example 379 may include the terminal device according to any one of Examples 359-378, wherein each network access node of the plurality of network access nodes is allocated a unique digital bit pattern.

Example 380 may include the terminal device according to any one of Examples 359-379, wherein the transmission is modified from an effective transmission by removing the digital bit pattern associated with the distinguishing transmission feature from a predetermined position of the effective transmission.

Example 381 may include the terminal device according to Example 380, wherein the transmission is a truncated version of the effective transmission.

Example 382 may include the terminal device according to Example 380, wherein the transmission is transmitted by the network access node of the plurality of network access nodes associated with the distinguishing transmission feature and allocated the digital bit pattern removed from the predetermined position of the effective transmission.

Example 383 may include the terminal device according to any one of Examples 359-382, wherein identifying the distinguishing transmission feature from the transmission includes comparing each distinguishing transmission feature of the plurality of network access nodes to the transmission.

Example 384 may include the terminal device according to any one of Examples 359-383, wherein the digital bit pattern is added to the transmission in the predetermined position to recreate the effective transmission.

Example 385 may include the terminal device according to any one of Examples 359-384, wherein the plurality of network access nodes are part of a small cell network.

Example 386 may include the terminal device according to any one of Examples 359-385, wherein the plurality of network access nodes operate in a spectrum above 6 GHz.

Example 387 may include the terminal device according to any one of Examples 359-386, wherein the plurality of network access nodes operate in a millimeter wave band.

Example 388 may include the terminal device according to any one of Examples 359-387, wherein the terminal device is configured to determine the distinguishing transmission feature from a training sequence transmitted from a network access node of the plurality of network access nodes.

Example 389 may include the terminal device according to any one of Examples 359-386, wherein the distinguishing characteristic of the channel is at least one of: a signal metric, a transmission frequency, and a channel metric.

Example 390 may include the terminal device according to Example 389, wherein the signal metric is based on at least one of: a signal power and a signal quality.

Example 391 may include the terminal device according to Example 390, wherein the signal quality is based on at least one of a noise level and/or an interference level.

Example 392 may include the terminal device according to Example 389, wherein the channel metric is based on at least one of a channel estimation and/or a channel correlation.

In an aspect of the disclosure, Example 393 may include a system configured to control communication between a network and a terminal device, the method including: the network including a plurality of available network access nodes that are detectable by the terminal device; wherein the network is configured to: select a plurality of network access nodes from the plurality of available network access nodes based on each network access node of the plurality of network access nodes having a channel difference from other channels of the plurality of available network access nodes greater than a noise variance level among the plurality of available network access nodes; allocate a digital bit pattern to each network access node of the plurality of network access nodes, wherein each network access node has a distinguishing channel due to the selection based on the channel difference; modify a transmission to the terminal device based on the digital bit pattern; transmit the transmission to the terminal device based on the digital bit pattern; and wherein the terminal device is configured to: receive the transmission at the terminal device; identify the distinguishing channel from the transmission; and process the transmission based on the digital bit pattern allocated to the distinguishing channel of the network access node.

Example 394 may include the system according to Example 393, wherein the channel difference is a Euclidean distance greater than the noise variance.

Example 395 may include the system according to Example 394, wherein the Euclidean distance is defined by $\|g_x[k]-g_y[k]\|^2$, $x,y \in \{1, \ldots, N\}$.

Example 396 may include the system according to any one of Examples 393-395, wherein the network is further configured to adjust a modulation order of the transmission based on the digital bit pattern.

Example 397 may include the system according to Example 396, wherein the modulation order is adjusted from an effective modulation order to a transmission modulation order based on the digital bit pattern.

Example 398 may include the system according to Example 397, wherein the effective modulation order is greater than the transmission modulation order.

Example 399 may include the system according to Example 397, wherein the effective modulation order is maintained and the transmission modulation order is reduced.

Example 400 may include the system according to any one of Examples 393-399, wherein the network is further configured to communicate the digital bit pattern allocated to each distinguishing channel to the terminal device.

Example 401 may include the system according to any one of Examples 393-400, wherein the network is further configured to select a network access node of the plurality of network access nodes to transmit the transmission to the terminal device based on the digital bit pattern.

Example 402 may include the system according to any one of Examples 393-401, wherein the network is further configured to update the plurality of network access nodes based on each network access node having a distinguishing channel.

Example 403 may include the system according to any one of Examples 393-402, wherein the network is further configured to update the plurality of network access nodes based on a measured parameter changing.

Example 404 may include the system according to any one of Examples 393-401, wherein the terminal device is further configured to update the plurality of network access nodes based on each network access node having a distinguishing channel.

Example 405 may include the system according to any one of Examples 393-404, wherein the terminal device is further configured to update the plurality of network access nodes based on a measured parameter changing.

Example 406 may include the system according to any one of Examples 403 and 405, wherein the measured parameter is at least one of: a location metric, a signal quality, a synchronization error, and a channel correlation.

Example 407 may include the system according to Example 406, wherein the location metric is a signal power.

Example 408 may include the system according to Example 407, wherein the signal power is a reference signal receiving power (RSRP).

Example 409 may include the system according to Example 408, wherein the signal quality is based on interference and noise measurements.

Example 410 may include the system according to Example 408, wherein the signal quality is at least one of: a signal to interference plus noise ratio (SINK) and/or a reference signal receiving quality (RSRQ).

Example 411 may include the system according to any one of Examples 393-410, wherein the digital bit pattern is included of a predefined number of characters.

Example 412 may include the system according to any one of Examples 393-411, wherein the digital bit pattern is allocated to a network access node of the plurality of network access nodes associated with the distinguishing transmission feature.

Example 413 may include the system according to any one of Examples 393-412, wherein each network access node of the plurality of network access nodes is allocated a unique digital bit pattern.

Example 414 may include the system according to any one of Examples 393-413, wherein the transmission is modified from an effective transmission by removing the digital bit pattern associated with the distinguishing transmission feature from a predetermined position of the effective transmission.

Example 415 may include the system according to Example 414, wherein the transmission is a truncated version of the effective transmission.

Example 416 may include the system according to Example 414, wherein the transmission is transmitted by the network access node of the plurality of network access nodes associated with the distinguishing channel and allocated the digital bit pattern removed from the predetermined position of the effective transmission.

Example 417 may include the system according to any one of Examples 393-416, wherein identifying the distinguishing channel from the transmission includes comparing each distinguishing channel of the plurality of network access nodes to the transmission.

Example 418 may include the system according to any one of Examples 393-417, wherein the digital bit pattern is added to the transmission in the predetermined position to recreate the effective transmission.

Example 419 may include the system according to any one of Examples 393-418, wherein the plurality of network access nodes are part of a small cell network.

Example 420 may include the system according to any one of Examples 393-419, wherein the plurality of network access nodes operate in a spectrum above 6 GHz.

Example 421 may include the system according to any one of Examples 393-420, wherein the plurality of network access nodes operate in a millimeter wave band.

Example 422 may include the system according to any one of Examples 393-421, wherein the network is further configured to transmit a training sequence from each network access node of the plurality of network access nodes to the terminal device to identify the distinguishing channel.

Example 423 may include the system according to Example 422, wherein the terminal device determines the distinguishing channel from the training sequence.

Example 424 may include the system according to any one of Examples 393-420, wherein the distinguishing channel is a channel estimation for each network access node. In an aspect of the disclosure, Example 425 may be a transmitter configured to transmit to a receiver and further configured to: transmit a truncated transmission of an effective transmission with a distinguishing transmission feature to the receiver, wherein the truncated transmission corresponds to a lower bit number than the effective transmission.

Example 426 may include the transmitter of Example 425, wherein the distinguishing transmission feature is allocated a digital bit pattern.

Example 427 may include the transmitter of Example 425, wherein the distinguishing transmission feature is based on at least one of: a network access node position, a unique bit pattern in the transmission, a code division multiple access (CDMA) code, a multicarrier assignment, a frequency, a time slot, a directional transmission, and/or a channel characteristic.

Example 428 may include the transmitter of Example 425, wherein the transmitter is further configured to receive allocation of the distinguishing transmission feature.

Example 429 may include the transmitter of Example 425, wherein the truncated transmission encodes data symbols in a modulation alphabet.

Example 430 may include any one of Examples 1, 36, 64, 97, 127, 162, 190, 223, 253, 291, 325, 359, and 393, wherein the digital bit pattern comprises m bits, an effective transmission comprises k bits, and the transmission is a truncated version of the effective transmission comprising m–k bits.

The terms "user equipment", "UE", "mobile terminal", "user terminal", "terminal device", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms and notations defined in the above description additionally hold in all Claims included herein.

While the invention has been particularly shown and described with reference to specific embodiments, it should be understood by those skilled in the art that various changes in form and detail may be made therein without departing from the spirit and scope of the invention as defined by the appended Claims. The scope of the invention is thus indicated by the appended Claims, and all changes within the meaning and range of equivalency of the claims are therefore intended to be embraced.

What is claimed is:

1. A receiver configured to receive a transmission, and further configured to:
   select a plurality of network access nodes based on each network access node being associated with a distinguishing transmission feature, wherein the plurality of network access nodes are selected based on each network access node of the plurality of network access nodes having a channel difference from other channels of a plurality of available network access nodes that are detectable by a terminal device, and wherein the channel difference is a Euclidean distance greater than a noise variance level among the plurality of available network access nodes;
   receive a digital bit pattern allocated to each distinguishing transmission feature;
   receive the transmission at the terminal device;
   identify the distinguishing transmission feature from the transmission; and
   process the transmission based on the digital bit pattern allocated to the distinguishing transmission feature.

2. The receiver according to claim 1,
   wherein the plurality of network access nodes are selected from the plurality of available network access nodes that are detectable by the terminal device.

3. The receiver according to claim 1,
   wherein the terminal device is further configured to receive a designation of a modulation order of the transmission based on the digital bit pattern.

4. The receiver according to claim 3,
   wherein the modulation order is adjusted from an effective modulation order to a transmission modulation order based on the digital bit pattern.

5. The receiver according to claim 4,
   wherein the effective modulation order is greater than the transmission modulation order.

6. The receiver according to claim 1,
   wherein the terminal device is further configured to update the plurality of network access nodes based on each network access node having a different distinguishing transmission feature.

7. The receiver according to claim 6,
   wherein the transmission is modified from an effective transmission by removing the digital bit pattern associated with the distinguishing transmission feature from a predetermined position of the effective transmission.

8. The receiver according to claim 7,
   wherein the digital bit pattern is added to the transmission in the predetermined position to recreate the effective transmission.

9. The receiver according to claim 6,
   wherein the digital bit pattern comprises m bits, an effective transmission comprises k bits, and the transmission is a truncated version of the effective transmission comprising m-k bits.

10. The receiver according to claim 6,
    wherein the terminal device is configured to determine the distinguishing transmission feature from a training sequence transmitted from a network access node of the plurality of network access nodes.

11. A non-transitory computer readable medium having computer executable instructions that cause a processing circuit to perform a method of receiving a transmission from a network, the method comprising:
    selecting a plurality of network access nodes based on each network access node being associated with a distinguishing transmission feature, wherein the plurality of network access nodes are selected based on each network access node of the plurality of network access nodes having a channel difference from other channels of a plurality of available network access nodes that are detectable by a terminal device, and wherein the channel difference is a Euclidean distance greater than a noise variance level among the plurality of available network access nodes;
    receiving designation of a digital bit pattern allocated to each distinguishing transmission feature;
    receiving the transmission at the terminal device;
    identifying the distinguishing transmission feature from the transmission; and
    processing the transmission based on the digital bit pattern allocated to the distinguishing transmission feature.

12. The method according to claim 11,
    wherein the plurality of network access nodes are selected from the plurality of available network access nodes that are detectable by the terminal device.

13. The method according to claim 11,
wherein the digital bit pattern comprises m bits, an effective transmission comprises k bits, and the transmission is a truncated version of the effective transmission comprising m-k bits.

14. A method for controlling communication between a network and a terminal device, the method comprising:
selecting a plurality of network access nodes based on each network access node having a distinguishing transmission feature, wherein the plurality of network access nodes are selected based on each network access node of the plurality of network access nodes having a channel difference from other channels of a plurality of available network access nodes that are detectable by the terminal device, and wherein the channel difference is a Euclidean distance greater than a noise variance level among the plurality of available network access nodes;
allocating a digital bit pattern to each distinguishing transmission feature;
modifying a transmission to the terminal device based on the digital bit pattern;
transmitting the transmission to the terminal device;
receiving the transmission at the terminal device;
identifying the distinguishing transmission feature from the transmission; and
processing the transmission based on the digital bit pattern allocated to the distinguishing transmission feature.

15. The method according to claim 14,
wherein the plurality of network access nodes are selected from the plurality of available network access nodes that are detectable by the terminal device.

16. The method according to claim 14,
wherein the digital bit pattern comprises m bits, an effective transmission comprises k bits, and the transmission is a truncated version of the effective transmission comprising m-k bits.

17. The method according to claim 14, further comprising:
receiving, with the terminal device, designation of a modulation order of the transmission based on the digital bit pattern.

18. The method according to claim 17,
wherein the modulation order is adjusted from an effective modulation order to a transmission modulation order based on the digital bit pattern.

19. The method according to claim 18,
wherein the effective modulation order is greater than the transmission modulation order.

20. The method according to claim 14, further comprising:
modifying the transmission from an effective transmission by removing the digital bit pattern associated with the distinguishing transmission feature from a predetermined position of the effective transmission.

* * * * *